(12) United States Patent
McGrath et al.

(10) Patent No.: US 10,051,400 B2
(45) Date of Patent: Aug. 14, 2018

(54) SYSTEM AND METHOD OF SPEAKER CLUSTER DESIGN AND RENDERING

(71) Applicant: DOLBY LABORATORIES LICENSING CORPORATION, San Francisco, CA (US)

(72) Inventors: David S. McGrath, Rose Bay (AU); Glenn N. Dickins, Como (AU); Paul Holmberg, Marsfield (AU); Gary Spittle, Hillsborough, CA (US); Michael Eckert, Ashfield (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 394 days.

(21) Appl. No.: 14/385,083

(22) PCT Filed: Mar. 21, 2013

(86) PCT No.: PCT/US2013/033238
§ 371 (c)(1),
(2) Date: Sep. 12, 2014

(87) PCT Pub. No.: WO2013/142657
PCT Pub. Date: Sep. 26, 2013

(65) Prior Publication Data
US 2015/0078594 A1 Mar. 19, 2015

Related U.S. Application Data

(60) Provisional application No. 61/614,756, filed on Mar. 23, 2012.

(51) Int. Cl.
*H04S 3/00* (2006.01)
*H04S 7/00* (2006.01)
*H04M 3/56* (2006.01)

(52) U.S. Cl.
CPC ............. *H04S 3/002* (2013.01); *H04M 3/568* (2013.01); *H04S 7/30* (2013.01); *H04S 2400/11* (2013.01);
(Continued)

(58) Field of Classification Search
CPC ........ H04S 3/002; H04S 7/30; H04S 2420/01; H04S 2400/15; H04S 2400/11; H04M 3/568
See application file for complete search history.

(56) References Cited

U.S. PATENT DOCUMENTS 3,992,586 A 11/1976 Jaffe
D342,732 S 12/1993 Hinman
(Continued)

FOREIGN PATENT DOCUMENTS

WO 2007/032108 3/2007

OTHER PUBLICATIONS

Aoki, S. et al., "Expansion of Lisening Area with Good Localization in Audio Conferencing," Acoustics, Speechm and Signal Processing, IEEE International Conference on ICASSP '87, vol. 12, pp. 149-152, Apr. 1987.
(Continued)

*Primary Examiner* — Ping Lee

(57) ABSTRACT

A method of outputting audio in a teleconferencing environment includes receiving audio streams, processing the audio streams according to information regarding effective spatial positions, and outputting, by at least three speakers arranged in more than one dimension, the audio streams having been processed. The information regarding the plurality of effective spatial positions corresponds to a perceived spatial scene that extends beyond the speakers in at least two dimensions. In this manner, participants in the teleconference perceive the audio from the remote partici-
(Continued)

pants as originating at different positions in the teleconference room.

25 Claims, 17 Drawing Sheets

(52) U.S. Cl.
CPC ....... *H04S 2400/15* (2013.01); *H04S 2420/01* (2013.01)

(56) References Cited

U.S. PATENT DOCUMENTS

| | | | |
|---|---|---|---|
| D411,995 S | 7/1999 | Chen | |
| 5,991,385 A | 11/1999 | Dunn | |
| D444,777 S | 7/2001 | Bird | |
| 6,453,155 B1 | 9/2002 | Hill | |
| D478,560 S | 8/2003 | Misrahi | |
| D481,371 S | 10/2003 | Chen | |
| 6,694,033 B1 | 2/2004 | Rimell | |
| D488,794 S | 4/2004 | Chen | |
| 6,850,496 B1 | 2/2005 | Knappe | |
| D556,179 S | 11/2007 | Chang | |
| D557,676 S | 12/2007 | Suzuki | |
| D571,776 S | 6/2008 | Duys | |
| D635,955 S | 4/2011 | Corrigan | |
| 8,073,125 B2 | 12/2011 | Zhang | |
| 2001/0012370 A1 | 8/2001 | Klayman | |
| 2003/0081115 A1 | 5/2003 | Curry | |
| 2004/0013252 A1 | 1/2004 | Craner | |
| 2004/0247134 A1 | 12/2004 | Miller | |
| 2007/0019812 A1 | 1/2007 | Kim | |
| 2007/0025538 A1 | 2/2007 | Jarske | |
| 2007/0160222 A1 | 7/2007 | Trepte | |
| 2008/0144794 A1 | 6/2008 | Gardner | |
| 2008/0159507 A1 | 7/2008 | Virolainen | |
| 2008/0298610 A1 | 12/2008 | Virolainen | |
| 2009/0052688 A1 | 2/2009 | Ishibashi | |
| 2009/0052701 A1 | 2/2009 | Reams | |
| 2009/0080632 A1* | 3/2009 | Zhang | H04M 3/568 379/202.01 |
| 2009/0116652 A1* | 5/2009 | Kirkeby | H04S 7/303 381/1 |
| 2010/0002899 A1 | 1/2010 | Tamaru | |
| 2010/0215164 A1 | 8/2010 | Sandgren | |
| 2010/0296678 A1 | 11/2010 | Kuhn-Rahloff | |
| 2010/0316232 A1* | 12/2010 | Acero | H04M 3/568 379/202.01 |
| 2010/0323793 A1 | 12/2010 | Andall | |
| 2011/0188342 A1 | 8/2011 | Sporer | |
| 2011/0194719 A1 | 8/2011 | Frater | |
| 2012/0014527 A1* | 1/2012 | Furse | H04S 3/00 381/17 |

OTHER PUBLICATIONS

Theile, G. et al., "Wave Field Synthesis—A Promise Spatial Audio Rendering Concept," Proc. of the 7th Int. Conference on Digital Audio Effects (DAFx '04), Naples, Italy, pp. 125-132, Oct. 5-8, 2004.

* cited by examiner

SYSTEM AND METHOD OF SPEAKER CLUSTER DESIGN AND RENDERING

CROSS REFERENCE TO RELATED APPLICATIONS

This application claims priority to U.S. Provisional patent application No. 61/614,756 filed Mar. 23, 2012, which is hereby incorporated by reference in its entirety.

BACKGROUND

The present invention relates to speaker cluster design and rendering, with particular application to teleconferencing systems.

Unless otherwise indicated herein, the approaches described in this section are not prior art to the claims in this application and are not admitted to be prior art by inclusion in this section.

In a standard teleconferencing system, multiple participants (audio sources) are combined into a single audio output at the destination. For example, the audio from Location 1 and Location 2 is combined and output at Location 3, the audio from Location 1 and Location 3 is combined and output at Location 2, etc.

The general goal of voice communications systems is to create a reasonable facsimile of voice over a distance with a minimal latency or introduction of unpleasant or distracting artefacts. Basic objective quality measures relate to the fidelity and reproduction of the voice signal across the system. One higher level objective measure is that of intelligibility and the extent to which the conversation can be understood.

Improvements in teleconferencing technology have been directed toward solving many problems. There is development in the field around capture, processing, coding, transport and reproduction of voice signals to achieve to achieve high intelligibility.

Another specific problem area relates to background noise. If two or more locations are generating background noise, a risk exists that the teleconferencing system combines the noise into a larger background noise output at the destination. Many developments in teleconferencing technology have been directed toward the removal of background noise from the various sources, as this prevents the signal combination from overamplifying similar background noises. An example of a specific type of solution to background noise is voice activity detection (VAD). The received audio signals from a location are analyzed (e.g., by a teleconferencing server) and classified into voice signals and non-voice signals; the non-voice signals are not provided to the other participants in the teleconference. Alternatively, different types of signal processing may be applied to voice and non-voice signals, e.g., to control the output signal level.

Another problem area relates to feedback. The teleconferencing system needs to ensure that audio from Location 1 that is output at Location 2 is not retransmitted back to Location 1 as part of Location 2's transmission.

Another problem area relates to consistency in volume among teleconferencing locations. Development in this area includes measuring the received audio volume from each location (e.g., by a teleconferencing server) and applying leveling to increase or decrease the audio signals to be output at each teleconferencing location.

SUMMARY

The above-described methods do not address all the shortcomings of teleconferencing systems. Among these shortcomings are the difficulty of a listener to distinguish the source location for a particular participant's voice until the listener has become familiar enough with the voices from the various source locations.

In response to the above-noted shortcomings, an embodiment of the present invention does not simply recreate an existing or captured spatial scene, but is designed to appropriately render combinations of spatial and mono voice streams. The system may also include appropriate reproduction of ancillary conference audio such as announcements, introductions, and other informational audio. The general goals and achieved properties of an embodiment of the present invention are to be used primarily for voice communications, to be reasonably compact, to achieve a high level of intelligibility and potential for perceptual voice stream separation, to create a stable and plausible sound image, and to be reasonably isotropic in terms of perceived voice characteristics for all listening angles.

According to an embodiment, method outputs audio in a teleconferencing environment. The method includes receiving audio streams, processing the audio streams according to information regarding effective spatial positions, and outputting, by at least three speakers arranged in more than one dimension, the audio streams having been processed. The information regarding the effective spatial positions corresponds to a perceived spatial scene that extends beyond the speakers in at least two dimensions.

The audio streams may be output in perceived spatial locations according to the information regarding the effective spatial positions. The information regarding the effective spatial positions may correspond to perceived locations in the perceived spatial scene. The perceived locations may differ such that each of the audio streams originate at a corresponding perceived location.

The audio streams may be processed by enhancing out-of-phase components of the audio streams. The audio streams may be processed by enhancing differential components of the audio streams. The audio streams may be in WXY format. The audio streams may include at least two mono audio streams, a mono stream and a stereo stream, a spatial audio stream, or combinations thereof.

The audio streams may be processed to output the perceived spatial scene into a circular shape, into two circular shapes, into a spiral shape, into a spherical shape, or combinations thereof. The audio streams may be processed to output the perceived spatial scene that includes a vertical dimension.

The audio streams may be processed to output a first audio stream at a first effective spatial position and to output a second audio stream at a second effective spatial position. The second effective spatial position may be 120 degrees from the first effective spatial position. The audio streams may be processed to output a third audio stream at a third effective spatial position that is 120 degrees from the first effective spatial position and 120 degrees from the second effective spatial position.

The audio streams may include metadata that corresponds to the information regarding the effective spatial positions.

The audio streams may be processed by performing matrix processing operations on matrices. The matrix processing operations may include a panner matrix processing operation, an intermediate rendering matrix processing operation, a boost matrix processing operation, and a spatial mode matrix processing operation, or combinations thereof.

An apparatus outputs audio in a teleconferencing environment. The apparatus includes a processor and at least three speakers. The processor is configured to receive audio streams and to process the audio streams according to information regarding effective spatial positions. The speakers are arranged in more than one dimension and are configured to output the audio streams having been processed. The information regarding the plurality of effective spatial positions corresponds to a perceived spatial scene that extends beyond the speakers in at least two dimensions.

The apparatus may include a case. The case may have arms, faces, or a combination thereof. The faces may be located at the ends of the arms. The speakers may be located on the faces.

The apparatus may include a memory that is configured to store matrices that correspond to the plurality of audio streams. The processor may be configured to process the audio streams by performing matrix processing operations on the matrices.

The following detailed description and accompanying drawings provide a further understanding of the nature and advantages of the present invention.

DETAILED DESCRIPTION

Described herein are techniques for teleconferencing systems. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

Overview and General Description

Figure 1:
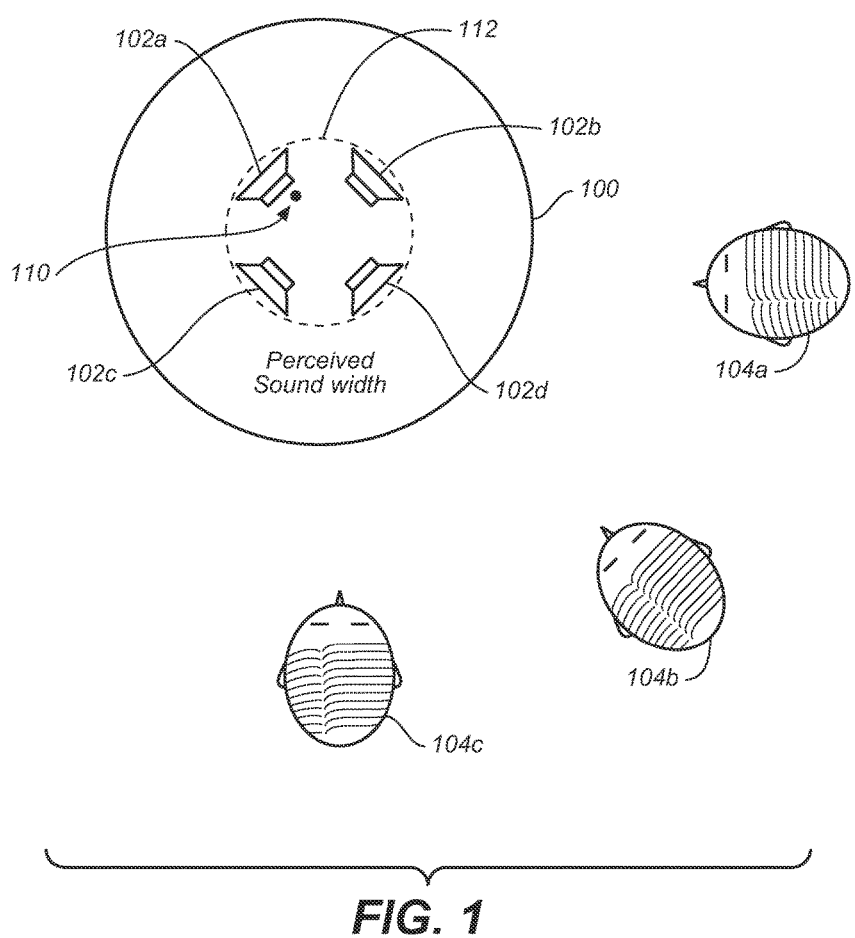
FIG. 1 is a diagram showing a widened 2-dimensional (2D) spatial scene (also referred to as the perceived sound width, the sound scene, or simply the scene) according to an embodiment.

FIG. 1 is a diagram showing a widened 2-dimensional (2D) spatial scene 100 (also referred to as the perceived sound width, the sound scene, or simply the scene) according to an embodiment. In general, the term "spatial scene" refers to the region of space over which a set of sources are perceived to originate, or to the specific perceptual layout of a set of sources being rendered to a listener. The widened 2D spatial scene 100 may be generated by three or more speakers 102 that are arranged two-dimensionally (e.g., not all along a single line). Four speakers 102a, 102b, 102c and 102d are shown as examples. The listeners 104a, 104b and 104c (collectively 104) are arranged in different positions around the speakers 102.

In the absence of widening, the spatial scene results in the listeners 104 perceiving the output of the speakers 102 as originating at or between one or more of the speakers 102, according to the component signals. The boundary 112 may be used to demarcate the region at or between the speakers 102, also referred to as "inside" the boundary 112. As an example, a signal may have its components directed 70% to speaker 102a and 10% respectively to speakers 102b, 102c and 102d. The listeners 104 would then perceive the output of the signal to originate at approximately the point 110 near the speaker 102a. Note that the point 110 is inside the boundary 112 defined by the arrangement of the speakers 102.

With widening, the spatial scene 100 results in the listeners 104 perceiving the output of the speakers 102 as originating inside the boundary 112 as well as extending throughout the larger volume 100, according to the component signals. This larger volume 100 may also be referred to as the spatial scene 100, which generally refers to the region across which the sound sources are perceived. When the spatial scene 100 is outside of the boundary 112, this is referred to as widening. One technique for widening the spatial scene 100 outside of the boundary 112 is to enhance the out-of-phase components of the signals, for example around 600 Hz. Another technique for widening the spatial scene 100 is to enhance the differential components of the signals.

Although four speakers are shown in FIG. 1, the widened spatial scene 100 may be achieved by three or more speakers that are not in a straight line. To illustrate the basic counter-example, consider two speakers. Two speakers may have a widened spatial scene by enhancing the L-R component (the differential component in a two speaker system). The spatial scene widens along the line between the two speakers, so a listener must be positioned near the line perpendicular to the line between the speakers in order to perceive the wider spatial scene. The situation is the same for adding a third speaker in line with the other speakers; the listener must be perpendicular to that line to perceive the widened spatial scene. As a consequence, the embodiment shown in FIG. 1 includes at least three speakers not in a line, so that the widened spatial scene 100 is widened two-dimensionally, and may be perceived as such regardless of the position of the listeners 104.

As a specific example, the goal is to ensure that all sounds in the rendered spatial scene 100 appear approximately equal in loudness for all the listeners 104. This may be achieved by ensuring that, for each rendered sound, the amplitude of the sound present in each speaker 102 is equal (within 3 dB). Hence, the differences in the sound between different speakers should be mostly phase differences, not amplitude differences.

The speakers 102 may be embodied in a teleconferencing system. If the voices of a large number of talkers are sent over a telecom link, they may be pre-mixed into a smaller number of intermediate signals (such as WXY format). WXY format may then be rendered to the speaker array 102 by filtering and mixing. Further details of teleconferencing system embodiments are provided below.

Teleconferencing System Details

For effective and larger, scalable, conferencing systems, a more appropriate level of performance is the extent to which multiple participants to the conference call at a single site, or across multiple sites, can be heard and understood at a particular endpoint. Beyond general intelligibility there are suggested factors such as spatial separation, spatial unmasking, diversity, plausibility (realism), stability and listener isotropy. Whilst such factors are not rigorously defined, as active listeners, we all have extensive subjective experience and an ability to judge such dimensions of performance with some relative ranking. Further described below are the design and layout of transducers for the reproduction of audio at an end point, and a broad set of processing steps that we have applied to achieve superior performance against the listed subjective measures. There are several aspects that differ substantially from other existing teleconferencing systems, and can be considered counter intuitive (or orthogonal) to the problem construction and solutions of other existing teleconferencing systems. As further detailed below, embodiments set forth designs for a set of speakers, to allow the reproduction of voice signals arriving on one or more different channels into a spatial scene and achieve a high level of preferred multiparty and multisite conference listening experience.

As a further component, some of the designs and embodiments presented have an additional goal and designed property whereby a level of reduction or control in the signal which returns from the output transducers (speakers) to the input transducers (microphones) is achieved by way of a constraint on the physical layout and rendering space utilized by the device.

Of course, multiple speakers at the point of reproduction do exist in certain other existing telecommunication systems. Often these speakers are for achieving a desired spread of energy across the listening environment, or for recreating sound in a specific format, such as stereo or conventional multichannel (e.g., 5.1 surround). In contrast to these other existing systems, the speaker clusters presented herein, and the methods to create a balanced sound that offers a spatial scene with source separation as if the sources were occupying a spatial extent larger than the device, do so without creating undesirable or unpleasant artifacts—in particular where the device is designed to accommodate a range of input signals comprising simultaneous multichannel audio, and monaural audio streams for rendering.

An embodiment may be used in, but not limited to, a large scale voice conferencing system where the speaker and rendering component described herein has the function of producing an audio experience for the listeners at that end point which facilitates the audio and voice interaction of one or more parties across one or more remove sites.

An embodiment generally implements a voice conferencing endpoint that is designed to handle up to a number N of simultaneous voice streams or spatial channels where N>1. (Note that N may be equal to 1 in certain circumstances, e.g., when a first remote participant has been added to the teleconference and the other remote participants have not yet been added.) An embodiment generally implements audio stream processing and layout for a number S of output transducers or speakers where S≥3.

Figure 2:
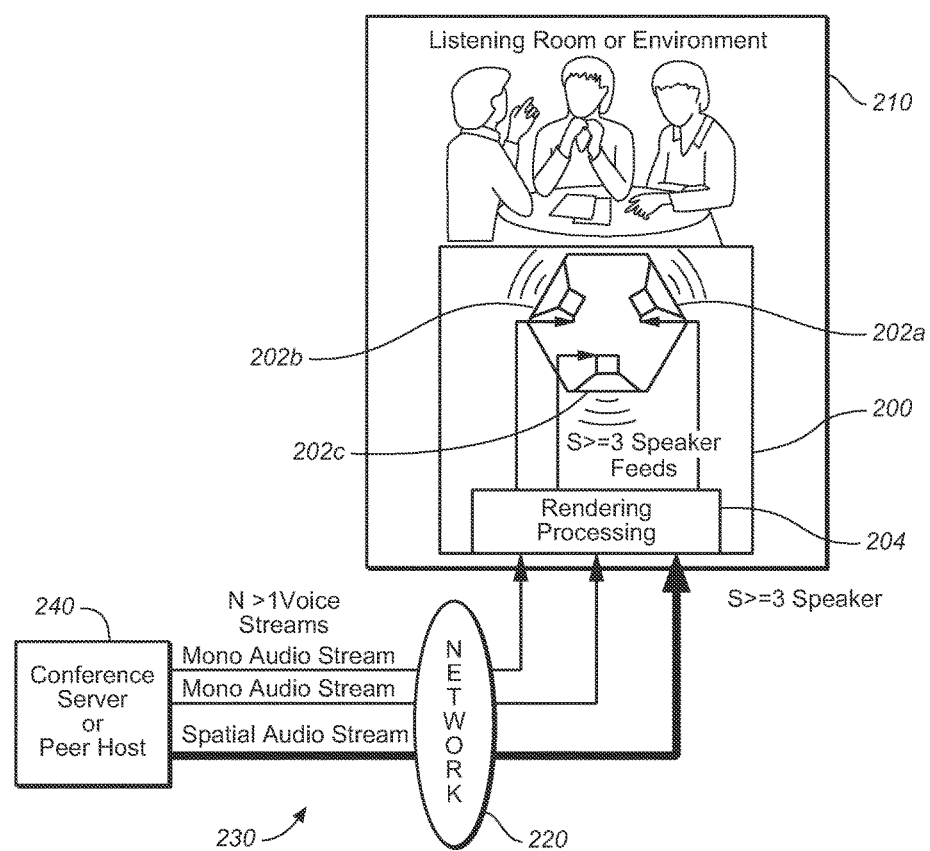
FIG. 2 is a block diagram that depicts the application of a voice conferencing endpoint according to an embodiment.

FIG. 2 is a block diagram that depicts the application of a voice conferencing endpoint 200 according to an embodiment. The endpoint 200 includes speakers 202 (three shown as 202a, 202b and 202c) and an audio stream processor 204. The endpoint 200 is generally located in a conference room 210, which may be referred to as the listening room or environment. The endpoint 200 connects to a network 220, which may be a telephone network, a computer network, the internet, etc. The endpoint 200 receives audio streams 230, which can at times number two or more (as more fully described below). The audio streams 230 may include mono audio streams, stereo audio streams, spatial audio streams, etc. A server 240 provides the audio streams 230 to the endpoint 200 via the network 220. The server 240 may be a conference server, peer host, etc. In general, other participants in the teleconference provide one or more of the audio streams 230 to the server 240; these input streams are not shown in the figure.

One objective is to maximize the rendered spatial audio variation between the set of N voice streams whilst avoiding undesirable listening artefacts. The following dimensions of this goal are identified:

Spatial separation: The extent to which two components of the rendered mix appear to have a spatial position or difference in position that facilitates spatial auditory segmentation and spatial unmasking.

Diversity: The number of degrees of freedom or dimensionality of the realised spatial scene at the positions of the listener. As a multiple input, multiple output system, this value represents the largest number of independent channels or a representation of the audio information capacity available to a listener utilizing spatial excitations.

Plausibility: The sounds should seem plausible and not in any way unnatural or 'unreal'. This relates to the spectral characteristics (timbre) in addition to the spatial presence and nature as perceived by the listener.

Stability: Upon movement of the device or listener, the perceived location or characteristics of a voice stream in the rendered mix should not rapidly fluctuate.

Listener Isotropy: All listeners across the expected listening range (usually the complete horizontal orientation of the device) experience a relatively similar experience with no particular voice streams overly attenuated or perceptually altered between different listening positions.

It is evident that many trivial solutions exist that satisfy the last three points. A single speaker facing upwards, for example, offers plausibility, stability and isotropy for a single voice stream. However, as a single speaker there is no spatial separation and a strict limit on diversity of 1. Panned stereo offers a degree of spatial separation and a diversity up to 2, however the separation is limited to the span of the speakers which for a compact device may not be sufficient for multi-party conferences. Whilst plausible, most stereo techniques suffer from stability with imaging collapsing to the nearest speaker, and anisotropy having a particular 'sweet spot'. Other techniques such as spatial scene rendering and virtualizers may be considered, but generally suffer from stability, isotropy and plausibility issues.

Further described below are the underlying theory, design principles, specific embodiments and rendering processing that provide a satisfactory solution across these five subjective considerations suited to the application of voice communications.

Radiated Spatial Diversity

Given the system is designed to handle more than one incoming voice stream, we want to preserve as much of the diversity, or potential for multiple simultaneous acoustic channels, between the input signals, through the rendering, out the speakers and to the listener. One definition of this is the radiated spatial diversity.

Since the speakers exist in a finite volume, there is a limit to the number of spatial modes at a given frequency that the device can excite with bounded energy regardless of the number of speakers. For example, at low frequencies, it becomes very difficult to direct or control the radiated power without driving large differential speaker excitations. Given the volume of the device and designed speaker array, we can use such considerations to effect and optimize the number and relative excitation of the various spatial modes or radiation modes out of a volume containing the device, against the power required to achieve this. Essentially this creates the possibility of maximizing the radiated spatial diversity specific to the device configuration, and not just accepting a fixed panning or rendering method. This factor is apparent in both the design of the rendering, and also the design of the speaker cluster, since certain geometric arrangements of speakers have preferable diversity properties within the same enclosing volume.

Some further theory around radiation diversity and transducer geometries suggests that for a given number of speakers, it is desirable to maximize the number of unique differential distances between the array pairs. Although we want a certain amount of rotational symmetry in the design to help with achieving listener isotropy, it is suggested, against much conventional design guidelines, that the array not be a simply polygon or regular array of speakers.

Figure 3:
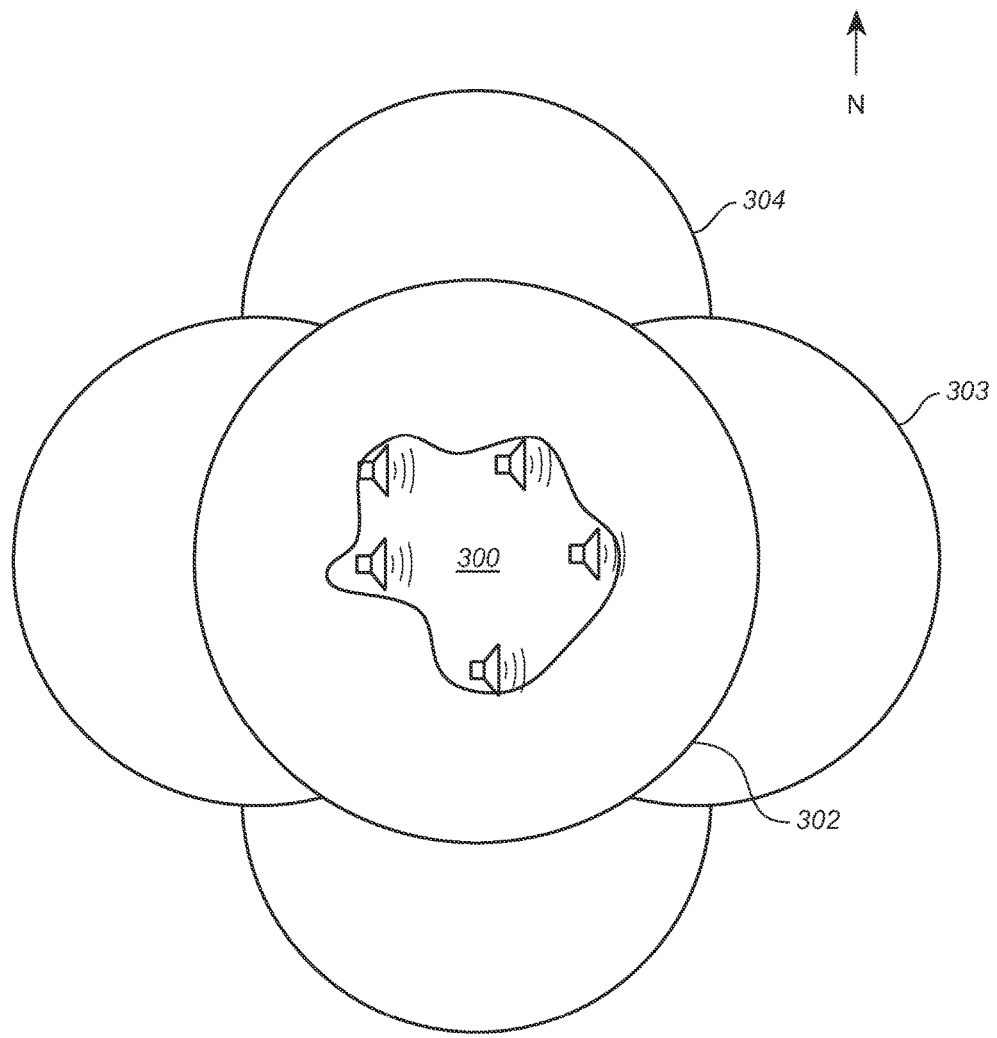
FIG. 3 is a diagram showing some exemplary spatial modes and radiation diversity from a set of speakers.

FIG. 3 is a diagram showing some exemplary spatial modes and radiation diversity from a set of speakers 300. Three spatial modes are shown: a circular mode 302 and two differential modes oriented in the east-west 303, and north-south 304, directions. These spatial modes are excited by virtue of different output signals applied to the speakers 300 within the device volume. To maximize the spatial diversity, for at least some frequencies it is desirable to place a similar amount of radiated energy in each of these illustrated mode. Higher order modes can be described in both the two dimensional and three dimensional case of a speaker arrangement, and this goal of balanced spatial mode radiation is again suitable for a given range of frequencies.

Perception of Spatial Sound

Spatial sound perception may be evaluated within the framework of specific spatial locations (azimuth, elevation, etc.) and anechoic head related transfer functions (HRTFs). Alternatively, it is apparent from simple experiments and the listening experience in any real room, that the auditory perception system is quite robust to reflections which perturb and convolute this simple spatial mapping. Yet, even in complex listening situations, such as through a doorway or at the back of a room, when the direct sound or directional component of a sound has very little energy, we can still effectively segment and direct our attention at different voice streams (in the case of the real world these are generally people). This may be referred to as the cocktail party effect. It is known that the cocktail party effect is robust even in quite reverberant or reflective listening conditions. In fact MIMO (multiple-input and multiple-output) wireless theory predicts that such scattering environments actually increase the informational capacity between two regions of space—if the scattered acoustic field is taken advantage of by the brain, this implies that to some level, scattering and convoluted acoustic cues can actually improve the ability to separate sources. Observations such as the ability to separate two voices in a room in the same direction, but different distances, suggest this is indeed the case.

So, the range of interesting or useful 'perceptual acoustic' cues that we can impart and use in a conferencing device to achieve a separation of sources, is much greater than the set of simple anechoic cues or those obtained from a set of speakers or a panned rendering model. With an appropriate set of perceptual cues imparted to the rendered sound, we can start to achieve a perceptual separation that exceeds the apparent physical location shift in auditory streams. This line of reasoning suggests that we should explore and utilize filtering and approaches in our systems that extend beyond the conventional 'direct sound and reverb' rendering models, and that the addition of short temporal structure in the period of the Haas window to actually improve source separability between multiple streams.

Figure 4:
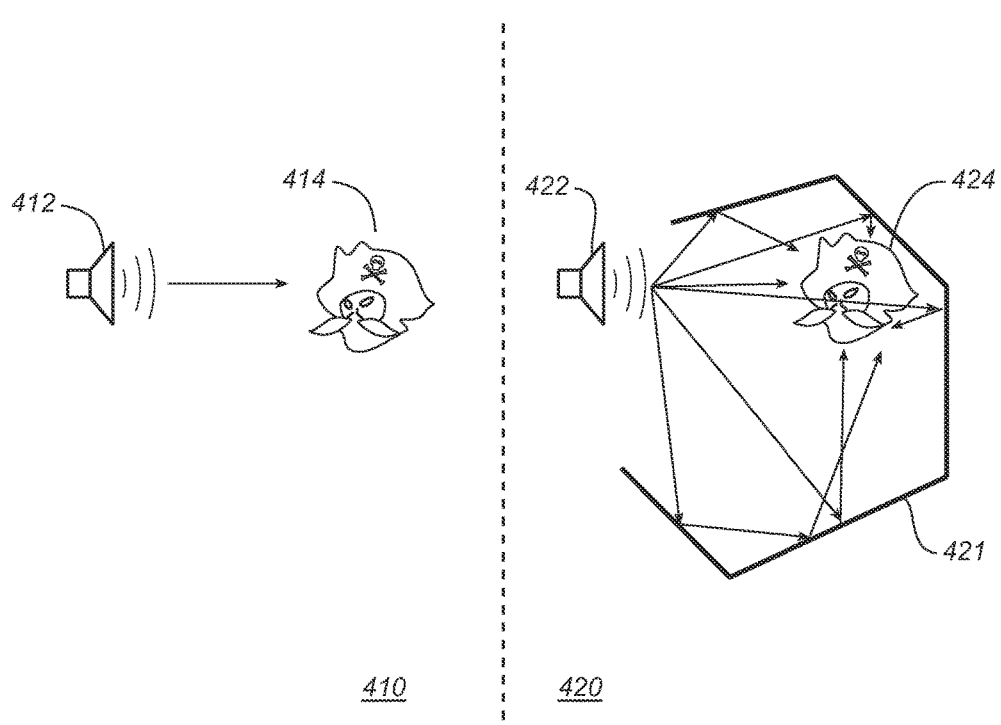
FIG. 4 is a diagram that illustrates scattering in two environments.

FIG. 4 is a diagram that illustrates scattering in two environments 410 and 420. In the environment 410, there is not scattering, and there is a single, direct sound path from the speaker 412 to the listener 414. In the environment 420, a number of walls 421 scatter the sound from the speaker 422 along multiple sound paths (only a few of which are shown) to the listener 424. Provided the environment 420 is not overly reverberant (circulant), even though the initial energy has no specific singular spatial position, it can still be perceived as having a stable and plausible spatial anchor (also referred to as the perceived source location or the perceived location). Arguably, if a second source was placed near the first source, the listener 424 in the environment 420 would have a greater ability to separate the two streams than the listener 414 in the environment 410. Embodiments implement rendering techniques which break some conventions and suggested designs for maximum audio quality and intelligibility, however improve the spatial separation by taking advantage of this.

Dipole Speaker Excitation

Aspects of theory above, namely the radiation diversity and transducer geometries theory, lead to a direction where a suitable combination of common mode and dipole excitation of a suitable speaker arrangement can maximize radiated diversity and create spatial cues and a spatial scene that extends beyond those that would be feasible from a single sound source constrained to the spatial extent of the speaker cluster.

Common in some exemplary embodiments presented is the design of a set of speaker pairs, operating with some dipole excitation, distributed throughout the device volume. Whilst not exhaustive in design, this multi dipole model provides a certain convenience in the speaker geometry design and complexity and efficiency in the design and implementation of the rendering.

Plausibility and Stability

The above theory of maximizing spatial diversity, if applied in isolation, can lead to designs that achieve high separation and diversity, but suffer from stability and plausibility. In order to find balance and maintain a suitable level of plausibility and stability, it is necessary to use an appropriate amount of lower order modes or excitation to balance the rendered scene. In particular, when there are more than one active voice, the spatial separation and diversity is beneficial and we may tolerate a lower stability. However, when the system operates for periods where there is only one active voice stream, the system may sacrifice the potential for immediate spatial separability in favor of a stable image. According to an embodiment, the common mode is present and is no more than 3-10 dB below higher modes.

A view of stability can be developed based on the extent to which perceptual cues are congruent and stable across frequencies as the listener or image moves. An additional consideration is the presence of nulls and phase inversions in the radiation patterns of particular channels. These are often the cause of stability issues, and can be ameliorated by an amount of common or lower order mode that is excited with a related but uncorrelated signal.

Listener Isotropy

A degree of radiated spatial diversity and source separation can be achieved by focusing the radiated energy in a particular direction. However, a side effect of this is a large shift in the perception of that voice stream depending on the position of the listener—inside or outside of the main radiated beam. This sort of anisotropy may be undesirable. Hence, an embodiment is directed to a rendering approach that reduces the anisotropy to a reasonably level whilst still achieving high diversity and stream separation.

Reduction of Acoustic Coupling

Although not a necessary component or requirement of some embodiments, other embodiments account for the acoustic coupling from the speakers to the microphones by implementing echo control and system design. Where the use is made of dipole or higher order excitations, these embodiments are designed (e.g., via the microphone placement) such that the coupling power or coupling diversity between the output signals and the input transducers is reduced or specifically at certain frequencies is only present at significant levels from the common mode signal sent to the speaker pair or dipole.

A specific example is one where the microphones are located centrally, and the radiated energy is achieved primarily with a set of dipole speaker pairs at the periphery of the device. This achieves a null that is co-incident with the center of the device and therefore reduces the coupling of rendered streams to the microphones.

Spatial Rendering Scenarios

There are many advantages for a listener when they are presented with multiple simultaneous speech sound sources that are spatially separated. These include the ability to identify and understand the individuals, as well as providing a more pleasant and involved listening experience. The auditory scene control and manipulation for a loudspeaker device is quite different to the approach taken when rendering to headphones. An embodiment renders the audio scene by placing sounds at different locations.

To provide background, the conventional stereo situations are described. The simplest method of presenting sounds that are perceived at different locations, using multiple speakers, is by using explicit loudspeakers for each stream. Signal processing can be used to reduce the number of loudspeakers to two, which is the typical stereo system. A stereo system uses panning, or level changes, to place a mono sound at a location between the two speakers. As described above, a two-speaker system can provide the impression of sounds located outside the physical boundary of the speakers by enhancing the differential component (e.g., L-R), but this solution architecture has a sweet spot in front of the two speakers.

The linear arrangement of multiple loudspeakers can be extended to other shapes. A circular arrangement, with the listeners inside the circle, provide a significant and useful separation of multiple simultaneous speech sounds. However, it can sound unnatural for talkers to be located behind a listener and so a frontal arc of loudspeakers would be preferred, which again has a limited sweet spot.

FIGS. 5-12 describe various spatial scenes. Note that these are figurative descriptions of the spatial scenes. The teleconferencing device creating a scene with increasing perceived spatial width (or height), and populates it across the desired range of angular anisotropy with an appropriate spread. Thus, FIGS. 5-12 and related text are suggestive of an approach for distributing sounds within the perceived spatial scene of all listeners. Not all listeners may perceive the spatial scene in the same way, nor may they all agree on the perceived location of sources as if they were anchored physically within the apparent rendering volume. Each listener will experience a spatial scene where the apparent and relative location of the rendered sources in the spatial scene has some properties of spatial location that occupies a volume and perceived direction similar to the indicative anchor points shown in FIGS. 5-12.

Figure 5:
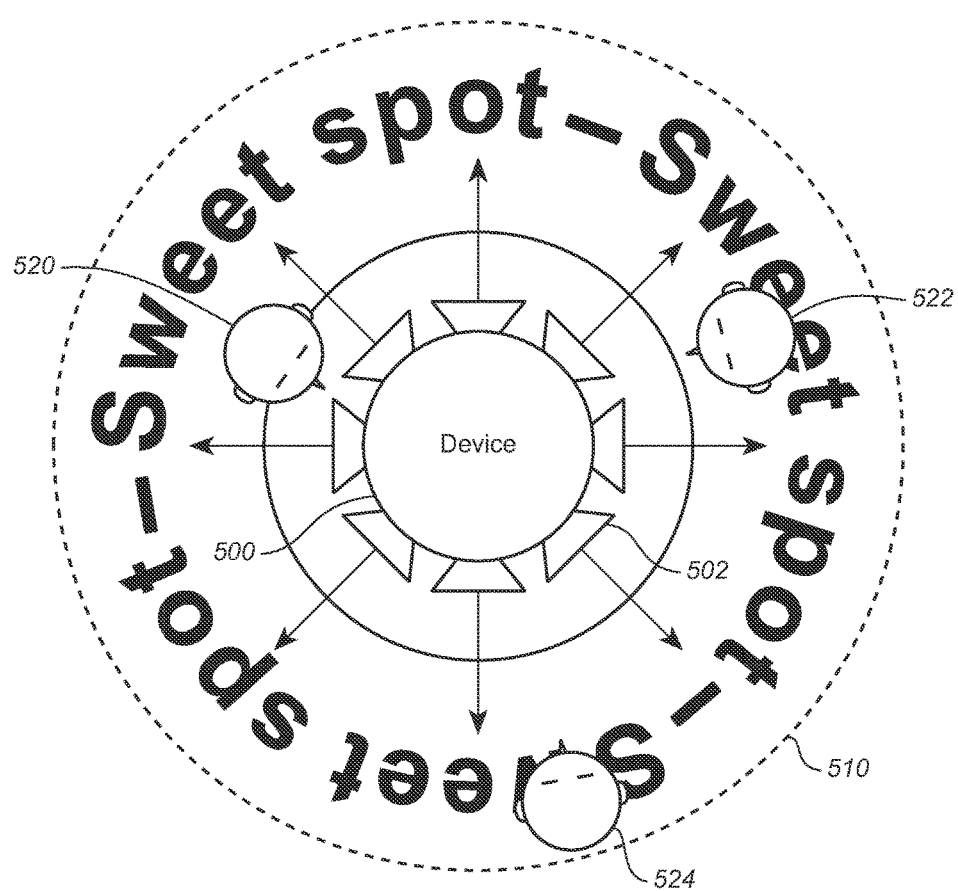
FIG. 5 is a diagram illustrating a toroidal region for desired listener positioning.

FIG. 5 is a diagram illustrating a toroidal region for desired listener positioning. The voice conferencing device 500 includes one or more speakers 502 (8 shown). The device 500 achieves a suitable level of performance and spatial scene rendered to any user present in this region having the shape of a toroid 510 that contains the listeners 520, 522 and 524. This allows the listeners 520, 522 and 524 in the room to all hear a plausible and perceptually similar spatial scene, no matter where they sit, and they can also easily converse with each other during a conference call. This could be achieved using a single loudspeaker in the center of a device however this would offer no source separation in the rendered spatial scene. A simple circular array of loudspeakers radiating outwards into the room could be driven with some of the embodiment components detailed in this work, and the suggested embodiments specific to speaker geometry have been found to offer superior performance against a consistent and functional spatial scene rendered to the listeners.

Embodiments may implement various signal processing steps to create a spatial scene in a room. An embodiment renders the spatial scene in a manner that is beneficial to all participants sitting around the device by creating a distributed and consistent rendering and minimizing any unnatural positioning of sounds.

Figure 6:
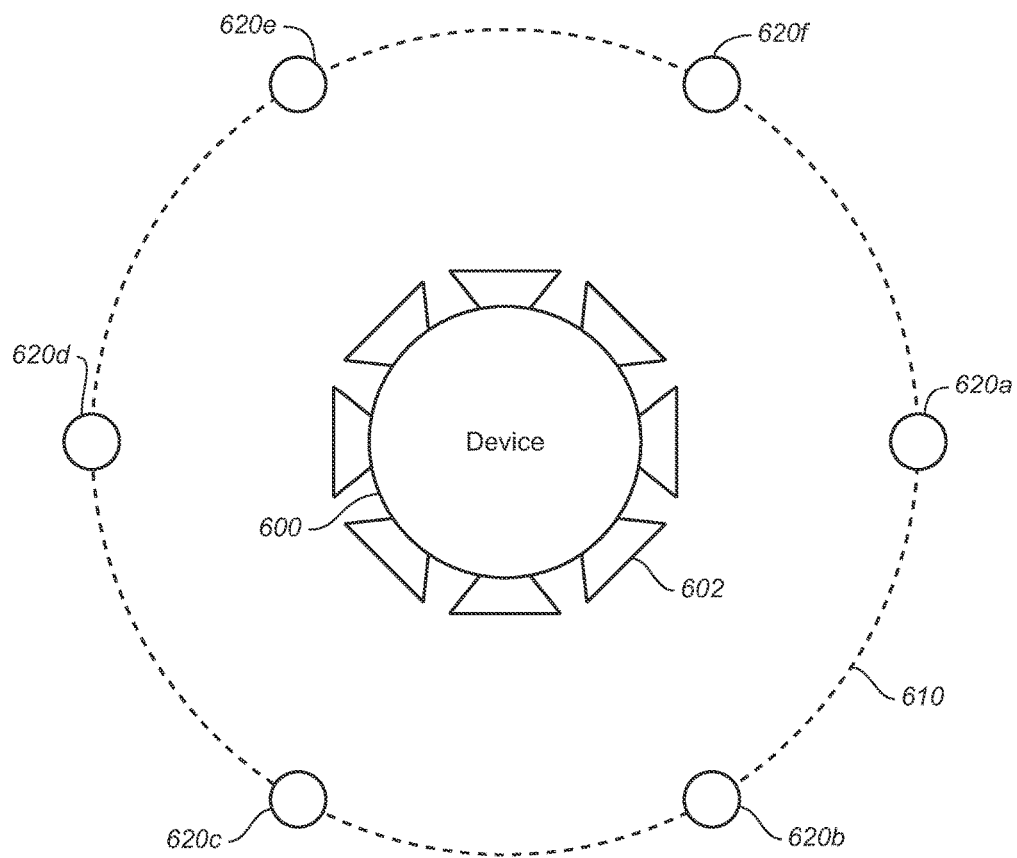
FIG. 6 is a diagram illustrating an arrangement of sounds in a circular formation.

FIG. 6 is a diagram illustrating an arrangement of sounds in a circular formation. The device 600 includes three or more speakers 602 (8 shown). The device 600 may generate an effective spatial scene for listeners located in a region the shape of a toroid (see FIG. 5) that includes the circle 610. The apparent width of the perceived spatial scene schematically indicated by the circle 610 may be limited such that a rendered sound does not appear to be perceptually distant or separated from the remainder of the spatial scene by a distance that would be associated with a source behind a real talker in the room. The width of the circle 610 may also ensure that the rendered sounds are not perceived as being significantly distant from the listeners in the room, for example if a rendered sound source has a perceptual direction roughly directly opposite a listener.

Along the circle 610 are shown six perceived figurative perceptual origin locations 620a-620f (collectively 620) corresponding to six teleconferencing sources. The device 600 processes the audio streams from each of the sources (e.g., by boosting the differential signals between pairs of audio signals) so that a listener perceives each of the source audio streams to originate in a spatial scene that is wider than the device and has a distinct set of perceptual location, indicated figuratively by the locations on the circle 610. This process may generally be referred to as processing the audio streams according to achieve the rendered spatial scene. Although six locations 620 are shown, as a scene grows, more locations can be added to the figurative circle 610. As more locations are added in the perceived spatial scene, the apparent distance between individual sources will decrease as the perceived spatial scene region is divided amongst more sources.

Figure 7:
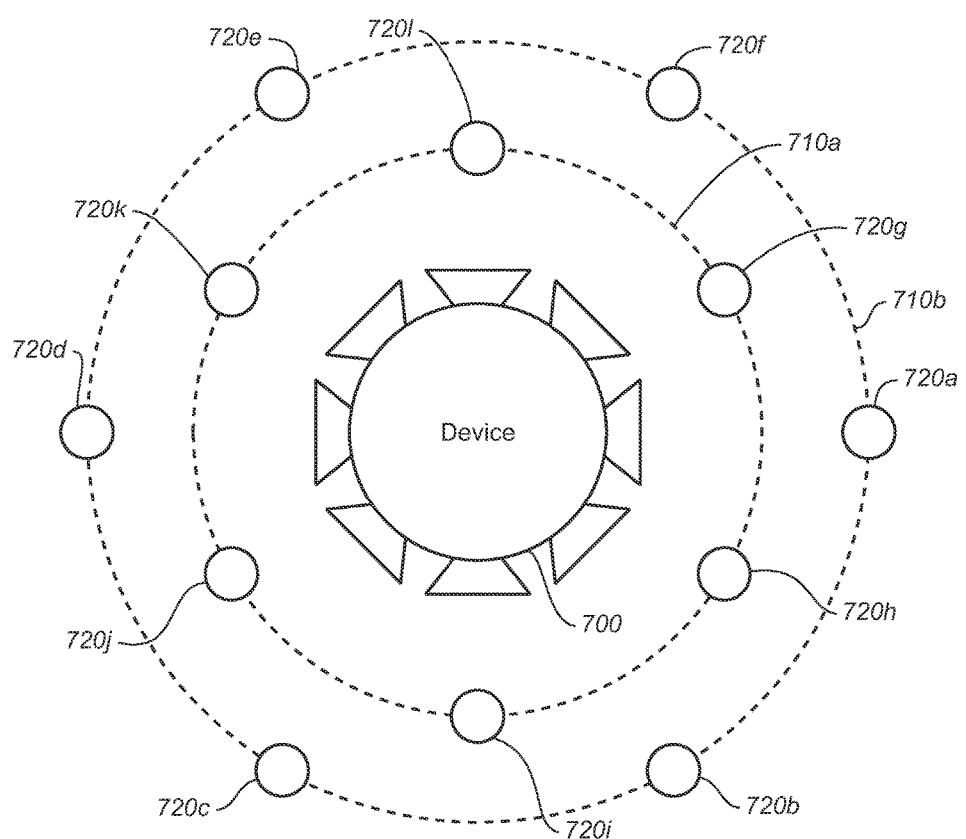
FIG. 7 is a diagram that modifies FIG. 6 with a figurative second circular formation to include more locations.

FIG. 7 is a diagram that modifies FIG. 6 with a figurative second circular formation to include more locations. In this case, the second figurative circle is rendered with an enhanced width property creating a perceptually different and wider perceived spatial scene. Adding more locations to FIG. 6 can cause the perceived spatial scene to become crowded, and thus difficult for listeners to differentiate between nearby perceived locations 620. FIG. 7 has two circles 710a and 710b of different figurative diameters, on which are twelve locations 720a-720l (collectively 710). Within reason, perceptual audio cues can be utilized to add additional figurative circles and perceptual locations as desired. Having multiple circles of different diameters allows the device 700 to fill the scene rather than only using the edge of the perceived spatial scene, and to produce a more densely populated spatial scene while maintaining perceived separation between the talkers.

Figure 8:
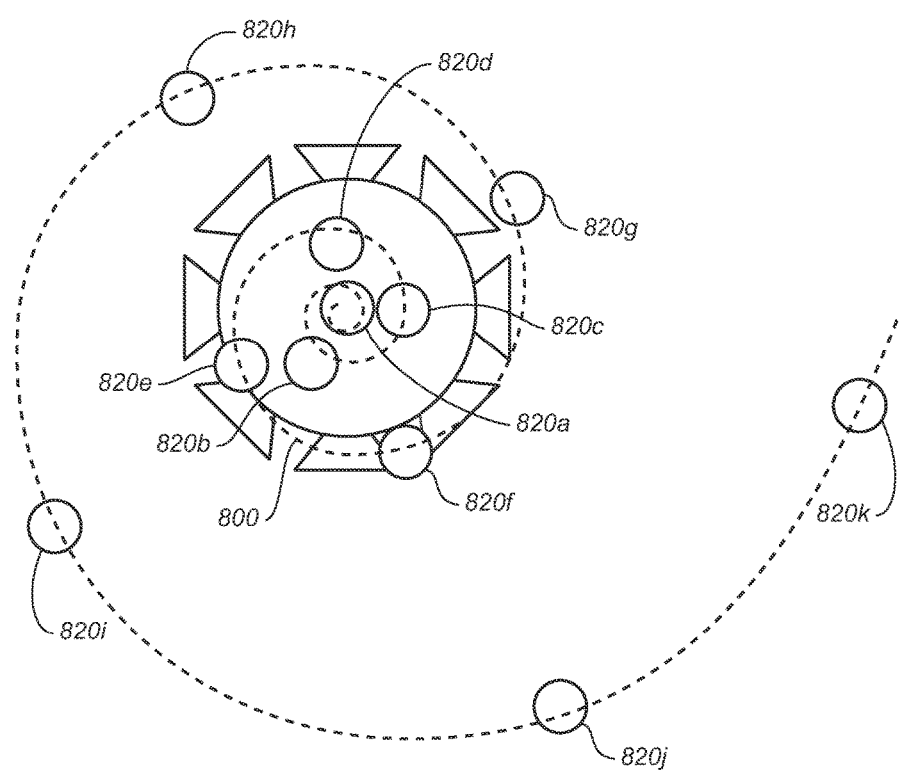
FIG. 8 is a diagram that modifies FIG. 6 from a circular formation to a spiral formation.

FIG. 8 is a diagram that modifies FIG. 6 from a circular formation to a spiral formation. The spiral 810 allows the device 800 to build the scene gradually outwards. This prevents a scene with only a small number of participants to be rendering sounds at the edge of the perceived spatial scene, as in the circle method of FIGS. 6-7. Instead the first sound is rendered towards the center of the device (location 820a) and the scene expands, as the number of participants increases, to locations 820b, 820c, 820d-820k, etc.

Figure 9A:
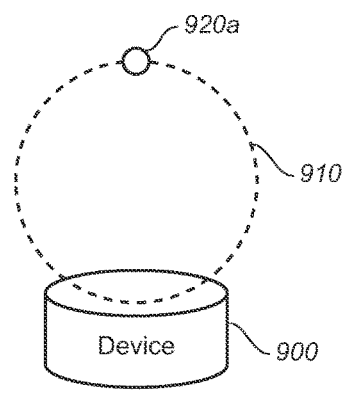
FIGS. 9A-9D are diagrams that illustrate that the device may utilize a different perceptual spatial sound dimension such as might be achieved by using elevation cues, or a degree of widening output over a three dimensional speaker array geometry.
Figure 9B:
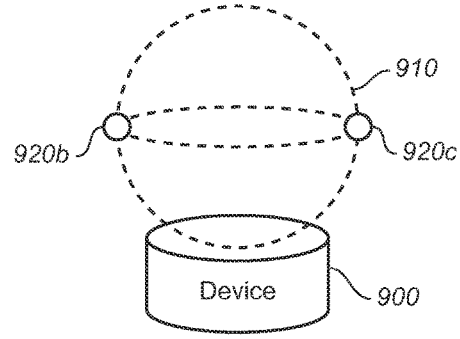
Figure 9C:
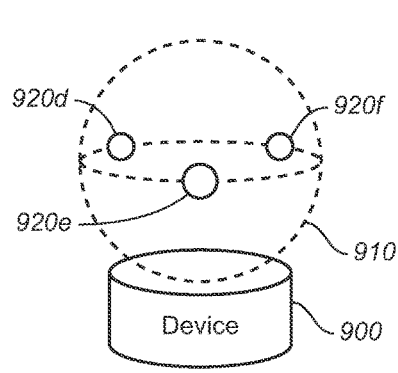
Figure 9D:
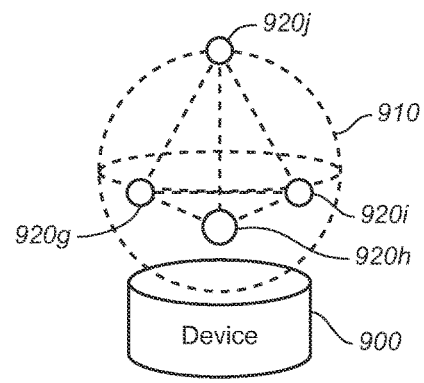

FIGS. 9A-9D are diagrams that illustrate that the device 900 may utilize a different perceptual spatial sound dimension such as might be achieved by using elevation cues, or a degree of widening output over a three dimensional speaker array geometry. This may allow the sound sources to be effectively placed on the surface of a figurative sphere. FIG. 9A illustrates the case with one (remote) participant. As more participants join, they are spatially placed in the perceived spatial scene to maximize the distance between each other, as consecutively shown in FIG. 9B (two participants), FIG. 9C (three participants) and FIG. 9D (four participants). The first participant may be placed at the top of the sphere 910 (location 920a). For 2 participants they are rendered to opposite sides of the sphere 910 (locations 920b-920c). For 3 participants they are equally spaced around the equator of the sphere 910 (locations 920d-920f). For 4 participants the locations form the vertices of a tetrahedron (locations 920g-920j).

Figure 10:
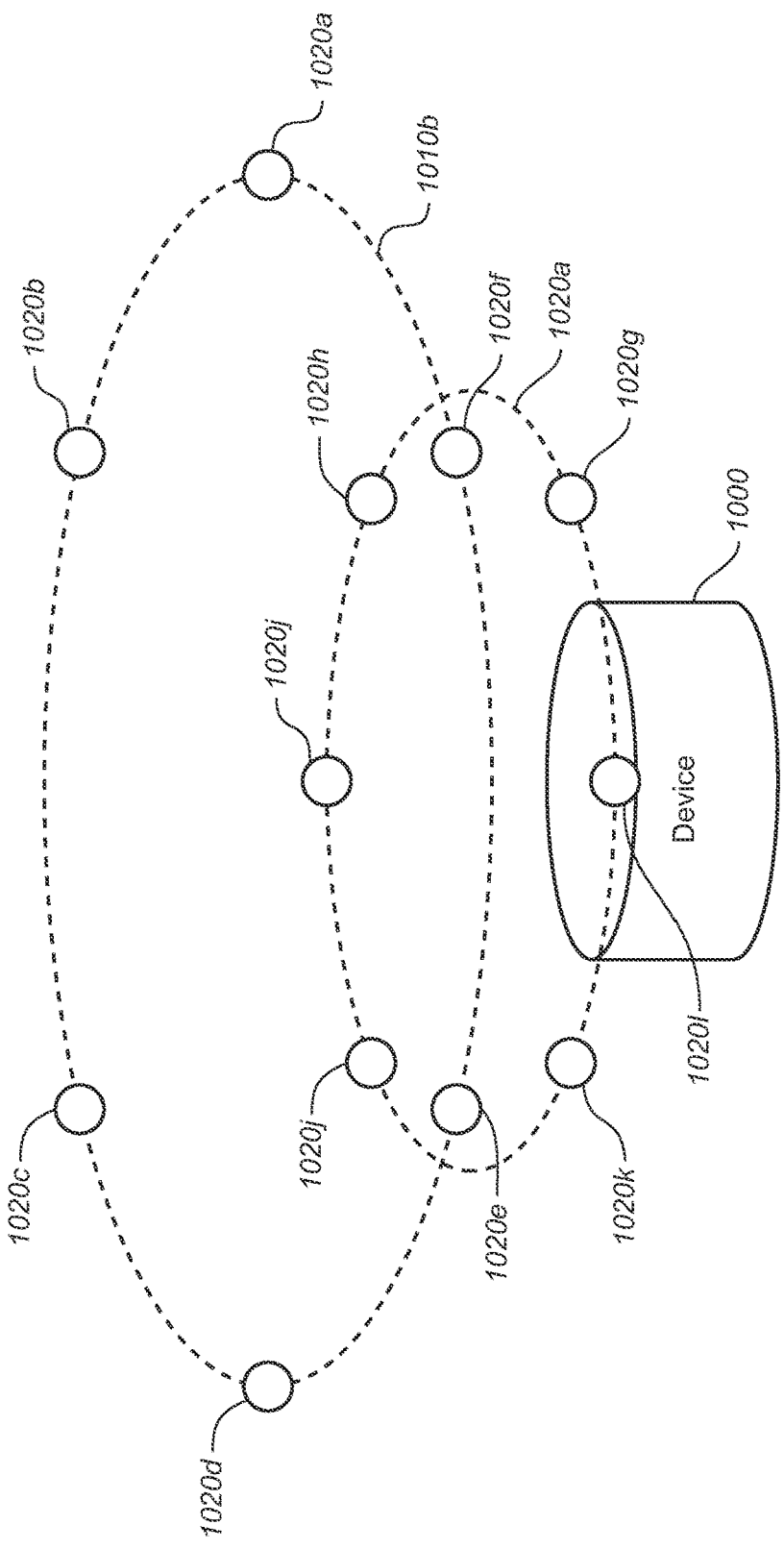
FIG. 10 shows that multiple layers of circular scenes can be created.
Figure 11:
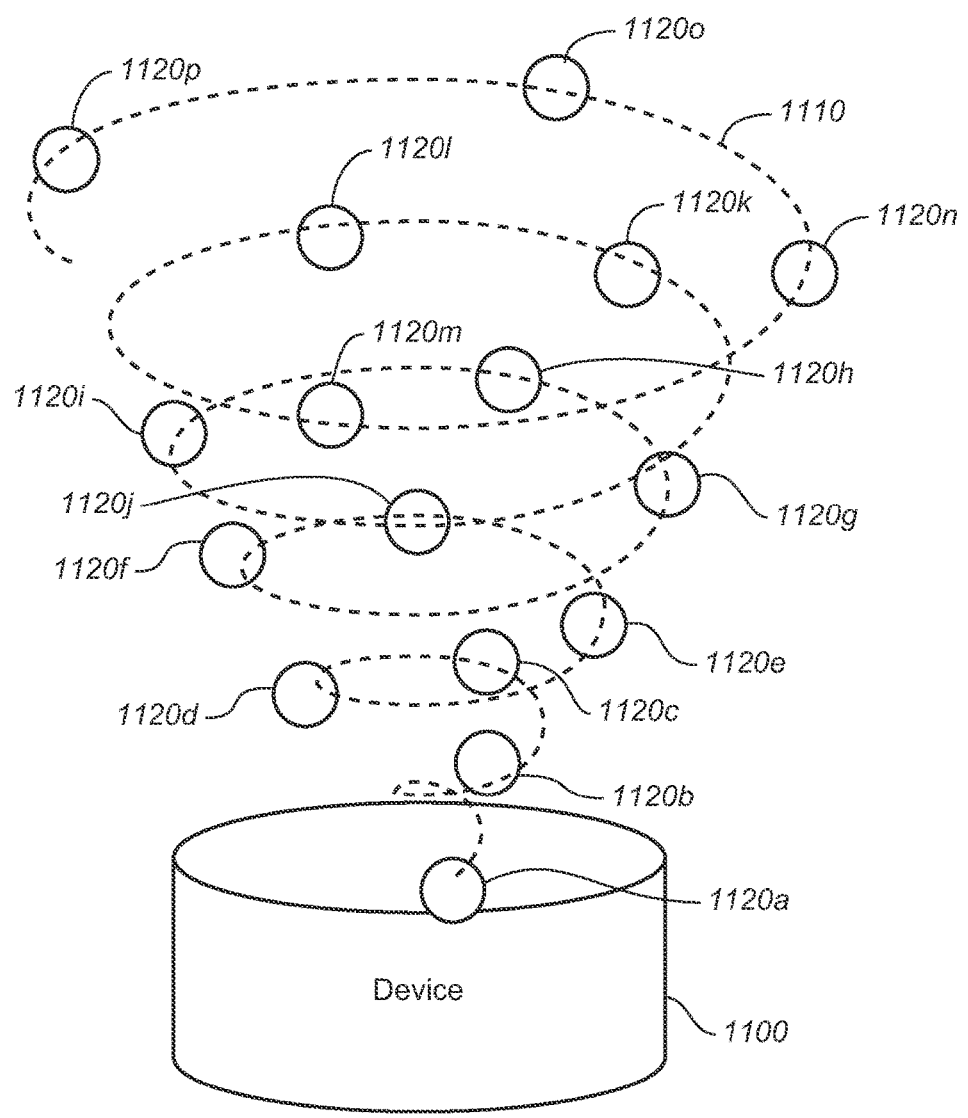
FIG. 11 shows that a conical helix or vortex of sound sources can be created.

FIGS. 10-11 are diagrams that illustrate that the devices 1000 and 1100 may combine a vertical axis or additional perceptual sound dimension (see, e.g., FIGS. 9A-9D) with the other two dimensions of the perceived spatial scene (see, e.g., FIGS. 6-8). FIG. 10 shows that multiple layers of circular scenes can be created using the circles 1010a and 1010b (locations 1020a-1020l). Multiple layers of circular scenes may be used to add further perceptual separation between talkers. FIG. 11 shows that a conical helix or vortex of sound sources can be created using the conical helix 1110 (locations 1120a-1120p). The conical helix 1110 arrangement of sound sources may be populated from the bottom upwards (e.g., starting at location 1120a). This creates a perceived spatial scene where the first participants have a perceptual location more central to the device, and sound sources further added become wider in both the horizontal and vertical associated dimensions of width or perceived spatial separation.

Scene Population

As has been mentioned, the aim of populating the perceived spatial scene is to ensure the overall sound is balanced, irrespective of the placement of the listener relative to the device and the scene. It is also preferable that any allocated positions within a scene are left untouched when additional participants join, i.e. the scene should not be shuffled around to make space for new participants. Embodiments may implement various processing steps to populate scenes in a pre-defined manner.

Figure 12:
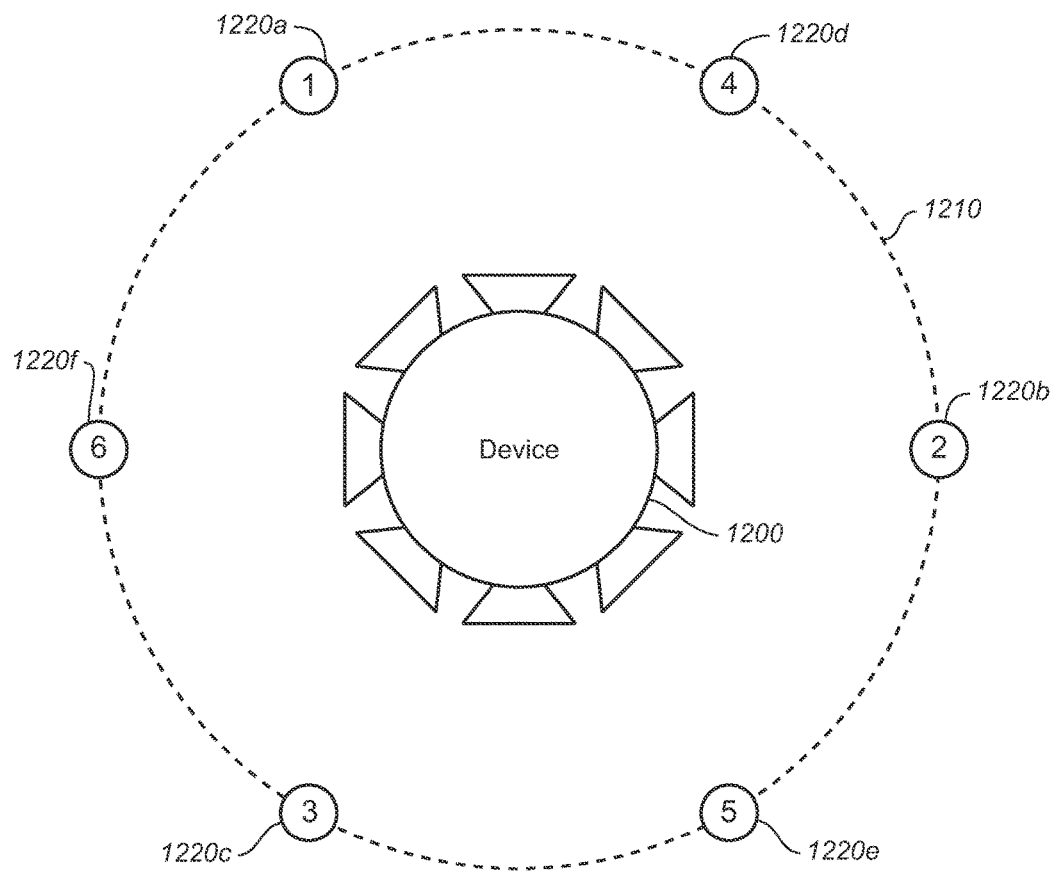
FIG. 12 is a diagram that illustrates one way to populate the scene.

FIG. 12 is a diagram that illustrates one way to populate the scene, by filling the largest gap first. The device 1200 may implement this by splitting the largest remaining gap of the circle 1210 into two equal segments. As shown, the circle 1210 has 6 locations 1220a-1220f to maintain a balanced scene for all listeners. In this example, the second participant (at location 1220b) is placed at 120 degrees from the first participant (at location 1220a) and not 180 degrees, which allows a 6 participant scene to be equally distributed around the circle.

Asymmetry

The scene descriptions discussed so far are mostly symmetric in their structure. This is not a restriction in the rendering logic. It may be preferable to have asymmetric scenes as it is unlikely that participants in a real meeting room will sit at precisely equal angles around a table. It is possible to apply small deltas to the radial angle, the width or distance of the sound source from the device, or the height.

Hardware Design Alternatives

Figure 13:
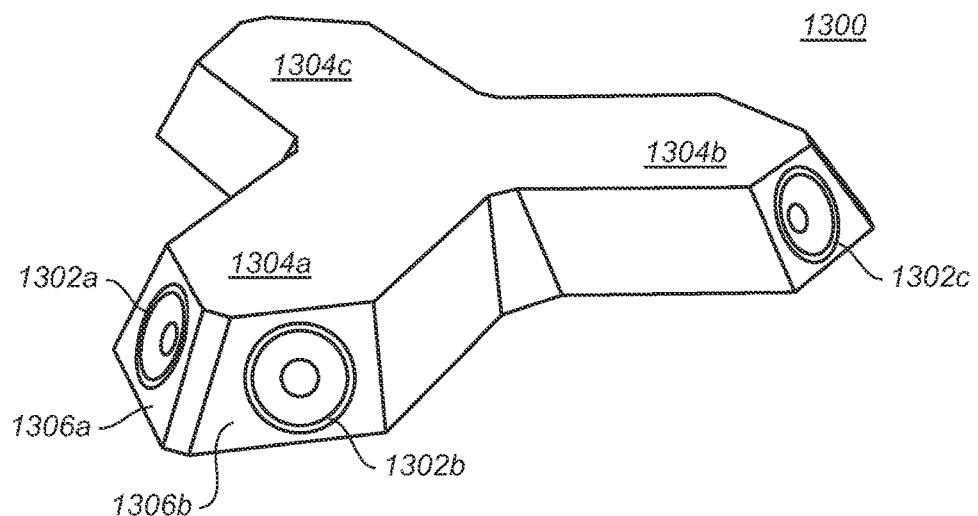
FIG. 13 shows a device having six speakers and three arms.

FIGS. 13-17 provide various hardware design alternatives for the teleconferencing device (e.g., the device 200 in FIG. 2). FIG. 13 shows a device 1300 having six speakers 1302 (three shown, 1302a-1302c) and three arms 1304a-1304c (collectively 1304). Each arm 1304 has two faces 1306, e.g., faces 1306a-1306b on the arm 1304a. Each face 1306 has one of the speakers 1302 (e.g., the face 1306a has the speaker 1302a). The faces 1306 may be angled slightly upward, e.g. at a 30 degree angle. The faces on an arm may be angled back along the length of the arm, e.g., at a 30 degree angle. The distance between the speakers on the same arm (e.g., speakers 1036a and 1306b) is less than the distance between a speaker on one arm and a speaker on another arm (e.g., speaker 1302b and the speakers on arms 1304b or 1304c). Note how the speakers are not pointing exactly radially out from the center of the device 1300, as there is a vertical offset (due to the angle of the faces 1306) and a horizontal offset (due to the faces 1306 being angled back along the arms 1304). One or more of these design features contribute to the device 1300 outputting the audio streams with spatial diversity as described above, by contributing to the shape of the spatial scene.

Figure 14:
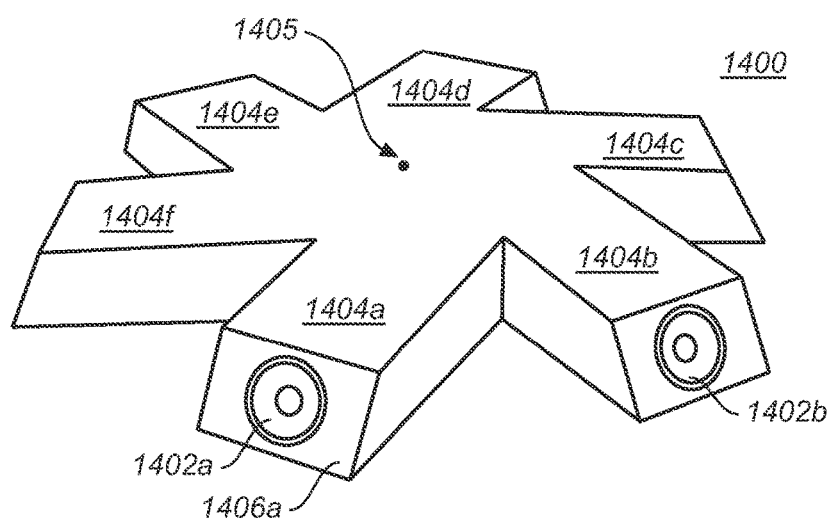
FIG. 14 shows a device having six speakers and six arms.

FIG. 14 shows a device 1400 having six speakers 1402 (two shown, 1402a-1402b) and six arms 1404a-1404f (collectively 1404). Opposing ones of the arms 1404 are offset from one another, e.g., the arm 1404a is offset from the arm 1404d on the line through the center 1405 of the device 1400. Each arm 1404 has a face 1406, e.g., face 1406a on the arm 1404a. Each face 1406 has one of the speakers 1402 (e.g., the face 1406a has the speaker 1402a). The faces 1406 may be angled slightly upward, e.g. at a 30 degree angle. The distance between adjacent ones of the speakers 1402 is the same. According to other embodiments (not shown), the lengths of the arms may not all be the same (or similar), which may cause the distance between adjacent ones of the speakers to differ. For example, the arms may have two lengths (long and short), alternating along the radius of the device. One or more of these design features contribute to the device 1400 outputting the audio streams with spatial diversity as described above, by contributing to the shape of the spatial scene.

Figure 15:
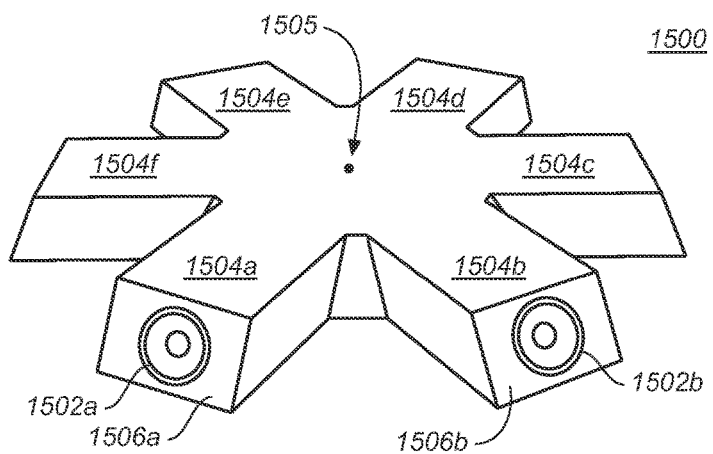
FIG. 15 shows a device that is similar to the device of FIG. 14, including speakers, arms and faces.

FIG. 15 shows a device 1500 that is similar to the device 1400 (see FIG. 14), including speakers 1502 (two shown, 1502a-1502b), arms 1504a-1504f and faces 1506 (two shown, 1506a-1506b). The difference from the device 1400 (see FIG. 14) is that opposing ones of the arms 1504 are not offset, they are on the line through the center 1505. One or more of these design features contribute to the device 1500 outputting the audio streams with spatial diversity as described above, by contributing to the shape of the spatial scene.

Figure 16:
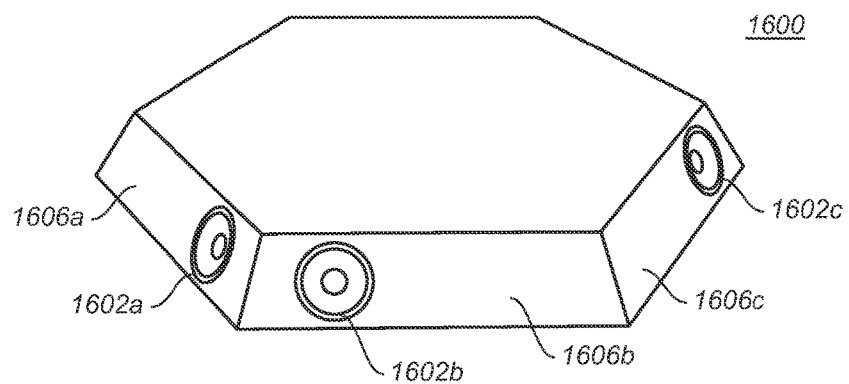
FIG. 16 shows a device having six speakers and six faces.

FIG. 16 shows a device 1600 having six speakers 1602 (three shown, 1602a-1602c) and six faces 1606 (three shown, 1606a-1606c). The faces 1606 may be angled slightly upward, e.g. at a 30 degree angle. The distance between adjacent speakers differs, e.g., the distance between the speakers 1602a-1602b is different from the distance between speakers 1602b-1602c. One or more of these design features contribute to the device 1600 outputting the audio streams with spatial diversity as described above, by contributing to the shape of the spatial scene.

Figure 17:
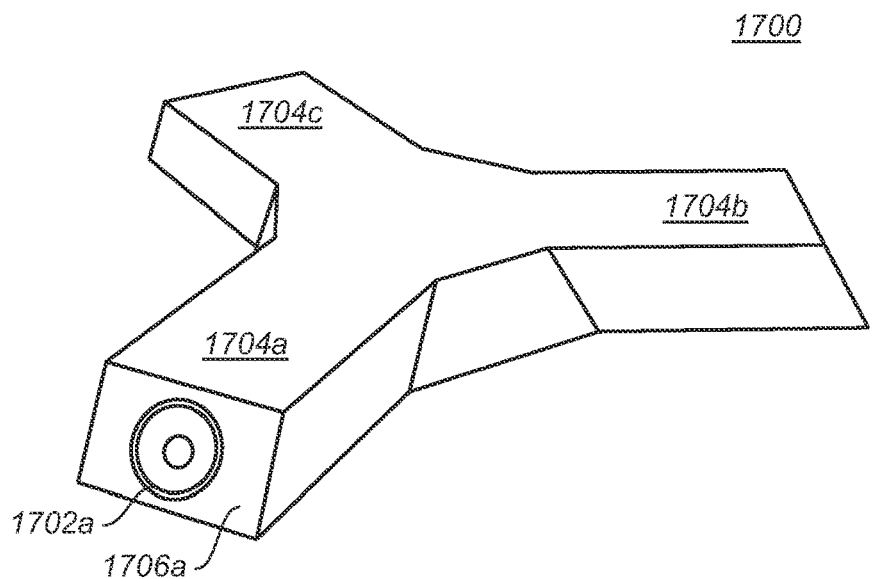
FIG. 17 shows a device having three speakers and three arms.

FIG. 17 shows a device 1700 having three speakers 1702 (one shown, 1702a) and three arms 1704a-1704c (collectively 1704). The arms 1704 have faces 1706 (one shown, 1706a). Each face 1706 has one of the speakers 1702 (e.g., the face 1706a has the speaker 1702a). The faces 1706 may be angled slightly upward, e.g. at a 30 degree angle. The distance between adjacent ones of the speakers 1702 is the same. According to other embodiments (not shown), the lengths of the arms may not all be the same (or similar), which may cause the distance between adjacent ones of the speakers to differ. For example, the arms may have two lengths (long and short), alternating along the radius of the device. One or more of these design features contribute to the device 1700 outputting the audio streams with spatial diversity as described above, by contributing to the shape of the spatial scene.

Metadata

An embodiment may use metadata associated with the voice streams (e.g., by the conferencing server) to select the rendering mode (e.g., circular, helical, etc.) and parameters (e.g., perceived location, etc.). For example, for a teleconference with four voice streams (e.g., audio streams 230 in FIG. 2), the metadata may instruct the teleconferencing device (e.g., the device 200 in FIG. 2) to position the four outputs respectively at the locations 1220a, 1220b, 1220c and 1220d of FIG. 12.

Spatial Audio Streams

As shown in FIG. 2, one of the audio streams 230 may be a spatial audio stream. To illustrate how the teleconferencing device (e.g., the device 200) outputs a spatial audio stream, consider a case when the audio stream 230 is just the spatial audio stream. This spatial audio stream may be captured by a WXY microphone at the other room involved in the teleconference. The device then outputs the audio stream 230 in the conference room using spatial scene widening as discussed above to place the sources in the other room at corresponding perceived locations in the conference room. For example, using FIG. 12, if the other room has three sources that correspond to locations 1220a, 1220b and 1220c in the other room, the device 1200 in the conference room may generate outputs that are perceived by listeners at locations 1220a, 1220b and 1220c in the conference room.

More generally, when the audio stream 230 (see FIG. 2) includes both mono audio streams and spatial audio streams, the device may generate the spatial audio streams with some fixed mapping such that their perceived spatial scene locations correspond in some way to their captured locations, and may generate the mono audio streams such that they fill in other locations in the spatial scene.

Use of an Intermediate Format for Representing 2D Spatial Scenes

Since the teleconferencing device (e.g., the device 200 of FIG. 2) is designed to render sounds so that they are perceptually separated spatially, the system may include a mechanism for separating sounds by tagging each sound with a notional location. We may sometimes refer to the "notional position" of a sound, by which we will mean "the notional position that this sound has been tagged with". Furthermore, it can be convenient to apply a notional "coordinate" for each location. These notional positions can be seen to correspond to the perceived position of the sounds to the listener within the spatial scene. Whilst the mapping may not be direct, or of any strict geometry, it is understood that the separation of sources and apparent width with regards to their "notional position" equates to a scaled separation and apparent width in the perceived spatial scene.

Figure 18:
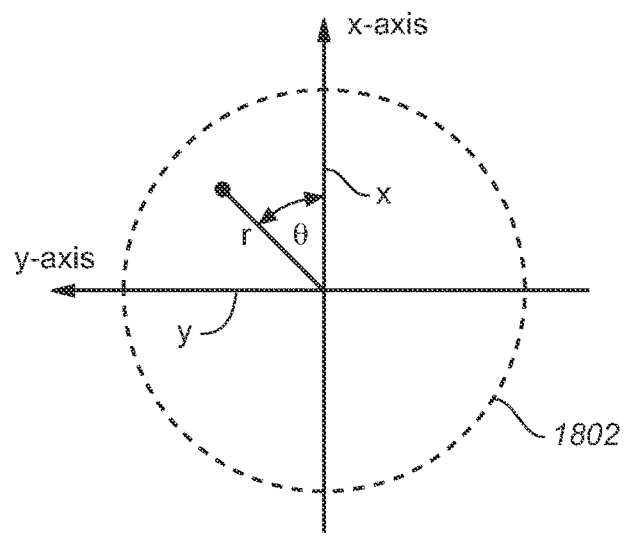
FIG. 18 shows an example of a coordinate system showing a location at (x,y) within the unit-circle.

FIG. 18 shows an example of such a coordinate system described above, showing a location at (x,y) within the unit-circle. This coordinate system shows the range of positions that sounds may occupy, within the dashed line 1802. Each point may be identified by its (x,y) coordinate, or in polar coordinates as (r,θ). The diagram is intended to show a "notional" sound location, and it should be noted that the intention of the rendering system is not necessarily to provide listeners with the impression of sounds that are located accurately according to this coordinate system, but instead it is intended that the rendering system should map sounds that are located at different positions within this notional coordinate system, so that these sounds are perceptually separable from the point of view of the listeners. Generally, the degree to which listeners are able to perceptually separate two sounds will increase as the distance between their notional positions increases.

Without loss of generality, we can define the size of the notional location space as a unit-circle (i.e. the radius r is less than or equal to 1). Of course, this principle may be extended to more than 2 dimensions, and the goal of the rendering system will be the same: to process sounds that are tagged with different notional locations so that they are perceptually separable by the listeners.

Figure 19:
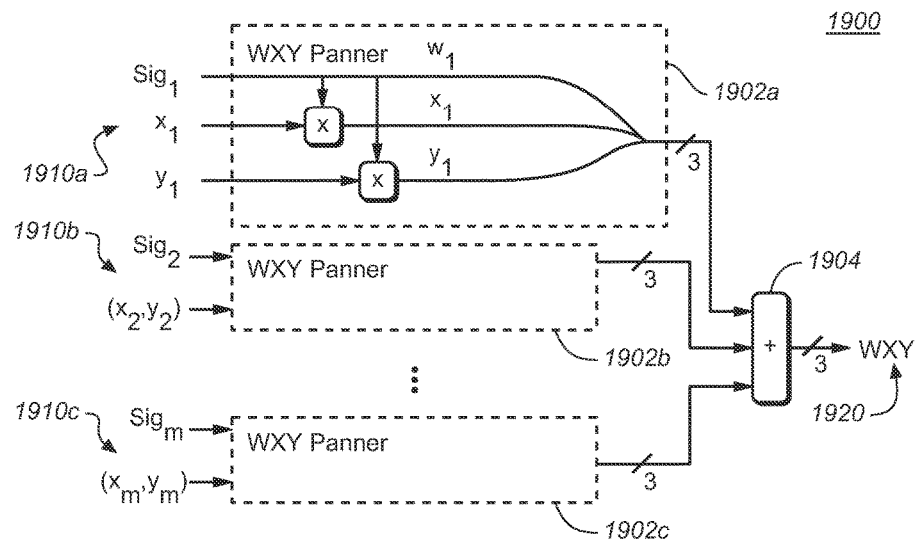
FIG. 19 is a block diagram of a system for converting signals (with associated notional locations) to WXY format.

In the case of the unit-circle location palette shown in FIG. 18, we may use the (x,y) notional location of each sound source to process the sound sources into a more convenient intermediate format, which we refer to as WXY format, as shown in FIG. 19.

FIG. 19 is a block diagram of a system 1900 for converting signals (with associated notional locations) to WXY format. The system 1900 includes WXY panners 1902 (three shown, 1902a-1902c) and a combiner 1904. Each of the panners 1902 receives an input signal 1910 with (x,y) notional location information (three inputs shown, 1910a-1910c). The combiner 1904 receives the outputs from the panners 1902 and generates the WXY signal 1920.

The system 1900 may be implemented by the teleconferencing device (e.g., the device 200 of FIG. 2). For example, the teleconferencing server 240 may provide the inputs 1910 to the device 200, including the signal and metadata indicating the (x,y) notional location information.

Alternatively, the system 1900 may be implemented by the teleconferencing server (e.g., the teleconferencing server 240 of FIG. 2). For example, the teleconferencing server 240 may receive the inputs 1910 from various remote locations and combine them into the WXY signal 1920 for transmission to an endpoint teleconferencing device.

As another alternative, a teleconferencing device (e.g., the device 200 of FIG. 2) at a remote endpoint may generate the WXY signal 1920 directly, for example using a WXY microphone. The teleconferencing server 240 would then combine the individual WXY signals from the endpoints into a combined WXY signal that is appropriately provided to each endpoint in the teleconference (e.g., for three locations, the audio from Locations 1 and 2 is sent to Location 3, etc.). The capture of spatial soundfields may be performed using a WXY microphone, and the WXY signals may be referred to as B-format. The B-format signals may include a $4^{th}$ signal, Z, that represents the extension of the 2-dimensional WXY format to 3 dimensions. This 3-dimensional format, and other forms of multi-channel signals that represent 2D or 3D soundfields, would also be applicable to various embodiments described herein.

More specifically, the creation of the intermediate format WXY signal 1920 is carried out by processing each individual sound (the inputs 1910) to form a multi-channel representation, whereby the processing that creates this intermediate format is adapted to make use of the notional location of the sound. For example, as shown in FIG. 19, the sound referred to as $Sig_1$ is processed to produce three signals $W_1$, $X_1$, $Y_1$ by the following linear mixing process:

$$W_1 = Sig_1$$
$$X_1 = x \times Sig_1$$
$$Y_1 = y \times Sig_1 \quad (1.1)$$

These signals may be combined (e.g., by the combiner 1904) with the intermediate signals created for other sounds, to create the W, X, Y signals:

$$W = \sum_{m=1}^{M} W_m \quad (1.2)$$
$$X = \sum_{m=1}^{M} X_m$$
$$Y = \sum_{m=1}^{M} Y_m$$

Multiple Channels (Talkers) Mixed into an Intermediate Format

If the voices of a large number of talkers are to be sent over a telecom link, they may be pre-mixed into a smaller number of intermediate signals (such as WXY format). WXY format may then be rendered to the speaker array by filtering and mixing.

Spatial Modes of a Speaker Array

An array of speakers may be fed from amplified signals that have been created by signal processing in a variety of ways. In most cases, the processing will be linear and time invariant, which means that this processing may be defined in terms of linear matrices. Matrix notation may be used to describe linear, time-invariant signal processing systems. Furthermore, the matrices may contain complex values, so that the complex values are used to define phase-shifts that are applied to the signals as part of the linear time-invariant processing. Furthermore, a linear, time-invariant system may be defined in terms of a matrix whereby each element of the matrix is a complex function of frequency (in the case where the operation of the system is different for different frequencies).

According to a favored embodiment, the rendering used in the teleconferencing device (e.g., the device 200 of FIG. 2) is linear and time-invariant. Cascaded signal processing elements that are linear may be combined into a single linear signal processing element, and the matrix that defines the linear processing of the combined processing element may be generated from the matrix product of the matrices that define the two cascaded linear processing elements.

Given an array of S speakers (S>2), and one of more sound sources, $Sig_1, Sig_2, \ldots, Sig_M$, we may define a rendering system according to the equation:

$$\begin{pmatrix} Spkr_1 \\ Spkr_2 \\ \vdots \\ Spkr_S \end{pmatrix} = \begin{pmatrix} r_{1,1} & r_{1,2} & \ldots & r_{1,M} \\ r_{2,1} & r_{2,2} & \ldots & r_{2,M} \\ \vdots & \vdots & \ddots & \vdots \\ r_{S,1} & r_{S,2} & \ldots & r_{S,M} \end{pmatrix} \times \begin{pmatrix} Sig_1 \\ Sig_2 \\ \vdots \\ Sig_M \end{pmatrix} \quad (1.3)$$

or we may use the shorthand notation:

$$Spkr = R \times Sig \quad (1.4)$$

Note that the elements of the matrix R may be complex variables that are a function of frequency, so we could be more precise by referring to $r_{1,1}(\omega)$ instead of $r_{1,1}$ as shown in equation (1.3).

Now, our task is to define the matrix R that suffices to define the processing of the rendering process (for the cases where our rendering process is linear and time invariant). One embodiment makes use of a "Spatial Mode Matrix" (F) that is used to process SpatialMode signals (SpatialMode$_1$, SpatialMode$_2$, . . . , SpatialMode$_S$) prior to the amplification that feeds the speakers:

$$Spkr = F \times \begin{pmatrix} SpatialMode_1 \\ SpatialMode_2 \\ \vdots \\ SpatialMode_S \end{pmatrix} \quad (1.5)$$

Where:

$$F = \begin{pmatrix} f_{1,1} & f_{1,2} & \cdots & f_{1,S} \\ f_{2,1} & f_{2,2} & \cdots & f_{2,S} \\ \vdots & \vdots & \ddots & \vdots \\ f_{S,1} & f_{S,2} & \cdots & f_{S,S} \end{pmatrix} \quad (1.6)$$

In one embodiment, F is a form of Discrete Fourier Transform matrix:

$$f_{n,m} = \frac{e^{2\pi i n m/S}}{\sqrt{S}} \quad (1.7)$$

Or, in another embodiment, F is a real transformation defined by:

$$f_{n,m} = \begin{cases} \frac{1}{\sqrt{S}} & (m = 1) \\ \frac{1}{\sqrt{S}} \cos\left(2\pi n \frac{m}{2S}\right) & m > 1, \text{ even} \\ \frac{1}{\sqrt{S}} \sin\left(2\pi n \frac{m-1}{2S}\right) & m > 1, \text{ odd} \end{cases} \quad (1.8)$$

For example, if the number of speakers is four (S=4), the real transformation F (as defined in equation (1.8)) would be:

$$F = \begin{pmatrix} \frac{1}{2} & \frac{1}{\sqrt{2}} & 0 & \frac{1}{2} \\ \frac{1}{2} & 0 & \frac{1}{\sqrt{2}} & -\frac{1}{2} \\ \frac{1}{2} & -\frac{1}{\sqrt{2}} & 0 & \frac{1}{2} \\ \frac{1}{2} & 0 & -\frac{1}{\sqrt{2}} & -\frac{1}{2} \end{pmatrix} \quad (1.9)$$

Now, the SpatialMode signals may be processed to produce the speaker signals by the following process:

$$\begin{pmatrix} Spkr_1 \\ Spkr_2 \\ \vdots \\ Spkr_S \end{pmatrix} = \begin{pmatrix} f_{1,1} & f_{1,2} & \cdots & f_{1,S} \\ f_{2,1} & f_{2,2} & \cdots & f_{2,S} \\ \vdots & \vdots & \ddots & \vdots \\ f_{S,1} & f_{S,2} & \cdots & f_{S,S} \end{pmatrix} \times \begin{pmatrix} SpatialMode_1 \\ SpatialMode_2 \\ \vdots \\ SpatialMode_S \end{pmatrix} \quad (1.10)$$

The SpatialMode signals provide an advantageous format for modifying the signals to enhance the spatial width of the sounds rendered via the speaker array. This spatial enhancement may be achieved by filtering each of the spatial mode signals (in a process we refer to as "Boost").

Figure 20:
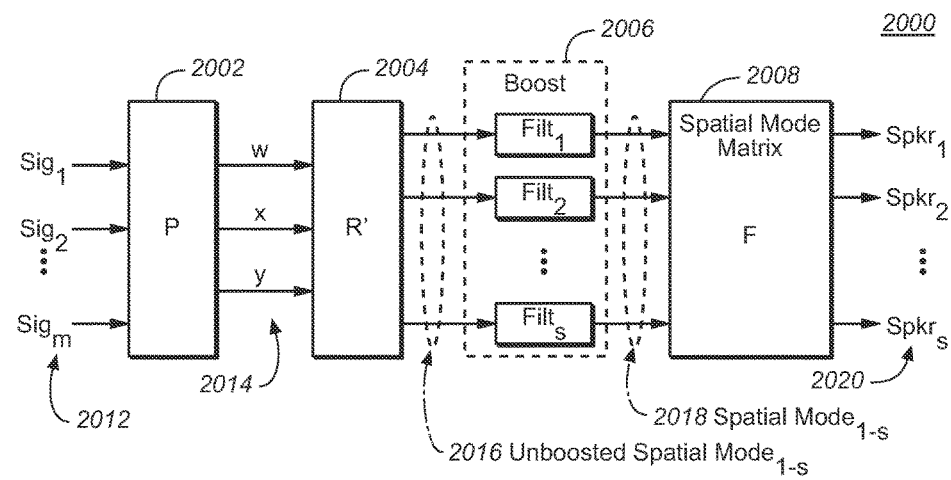
FIG. 20 is a block diagram of a circuit that performs spatial enhancement.

FIG. 20 is a block diagram of a circuit 2000 that performs the spatial enhancement described above. The circuit 2000 may be implemented by the teleconferencing device (e.g., the device 200 of FIG. 2, for example by the rendering processor 204). The spatial enhancement circuit 2000 includes a panner matrix processor 2002, a rendering matrix processor 2004, a boost matrix processor 2006, and a spatial mode matrix processor 2008. The boost matrix processor 2006 includes a number of filters (Filt$_1$, Filt$_2$, Filt$_S$, etc.). These components may be implemented by a memory (that stores the matrices) and a processor (that performs the associated processing on the matrices).

The WXY signals 2014 may alternately be produced by one or WXY panner circuits 1902 (see FIG. 19). Alternatively, the WXY signals 2014 may be captured by microphones at the remote endpoint. Furthermore, the WXY signals 2014 may be a WXY stream formed by the combination of a number of WXY signals that have been created by different methods.

Note that although four matrices and associated matrix processors (and corresponding matrix processing operations) are shown, since the matrix operations are linear, one or more of the blocks may be combined in various embodiments. It will often be a design choice whether to combine blocks or not. For example, when the number of speakers is known, this may suggest certain design opportunities to combine certain of the blocks. As another example, the filter Filt$_1$ often has a linear filter curve and may be omitted in a certain embodiment, which may suggest certain other design opportunities to combine certain of the blocks.

Looking again at equation (1.4), we may sometimes choose to think of R as the product of up to four separate matrix operations (according to the block diagram of FIG. 20) as follows:

$$R = F \times B \times R' \times P \quad (1.11)$$

where the component matrix processors are intended to perform the following functions:

P is the panner matrix processed by the panner matrix processor 2002, which converts the individual Sig$_M$ signals 2012 into an intermediate format 2014 (such as WXY format as described above), based on the "notional location" of each sound source. The role of the intermediate format 2014 is to provide a convenient (and possibly more compact) set of signals that can carry multiple sound sources in a smaller number of signals (three signals in this example).

R' is the intermediate rendering matrix processed by the intermediate rendering matrix processor 2004, which takes the intermediate format 2014 and produces the unboosted SpatialMode signals 2016.

B is the "Boost" matrix processed by the boost matrix processor 2006, which defines the processing that is applied to the unboosted SpatialMode signals 2016 to produce the SpatialMode signals 2018. The boost matrix processor 2006 generally operates on a diagonal matrix, which means that SpatialMode$_M$ is formed by filtering the unboosted SpatialMode$_M$ only (and hence the other SpatialMode signals are not used).

F is the spatial mode matrix processed by the spatial mode matrix processor 2008, which converts the SpatialMode signals 2018 to the speaker signals 2020 (for example, as per equation (1.10)).

Column i of the SpatialMode matrix F defines the way that SpatialMode$_i$ is panned to the speakers. In the example of Equation (1.9), it can be seen that the first column contains the same constant value (½) in each element, which means that the SpatialMode$_1$ signal will be panned equally (and in-phase) to all four speakers. This will result in a spatial scene that listeners will perceive as being very compact (and certainly not spread over an area any wider than the area spanned by the physical speaker array). Hence, we may say that SpatialMode$_1$ is a mode with a low degree of perceived spaciousness. In addition, SpatialMode$_1$ will typically exhibit an enhanced low-frequency response, because the ensemble of 4 speakers, operating in-phase, will sum constructively to result in an increased net radiation from the array at low frequencies.

In contrast, column 2 of the matrix (in equation (1.9)) indicates that SpatialMode$_2$ will be panned to the first and third speakers out-of-phase. This will result in a spatial scene, radiated from the speaker array, that will provide some enhanced sense of spaciousness for the listeners. In general, each SpatialMode$_i$ signal may be ranked according to the degree of perceived spaciousness of the spatial scene it generates (via column i of the SpatialMode matrix F).

If the speakers in the array are formed into an approximately circular array, and furthermore they are ordered in a sequential anticlockwise (or clockwise) order, then the columns of the SpatialMode matrix F as defined in Equation (1.8) will generally correspond to SpatialModes that have approximately monotonic increasing perceived spaciousness.

In contrast, whilst the SpatialMode signals 2018 are arranged in order of increasing spaciousness, this implies that they also tend to be arranged in order of decreasing low-frequency response. This is because the more spacious modes make use of closely spaced speakers that are fed with out-of-phase signals, and these out-of-phase signals create lower amplitude radiated sounds, particularly at low frequencies. In order to rectify this loss of low-frequency response, it is necessary to boost the low-frequency signal components of the higher numbered unboosted SpatialMode signals 2016. At very low frequencies, this boosting will become unbounded, and therefore it is prudent to decrease the gain of the Boost filters down at around 100 Hz (where the energy in typical voice signals becomes less important).

Figure 21:
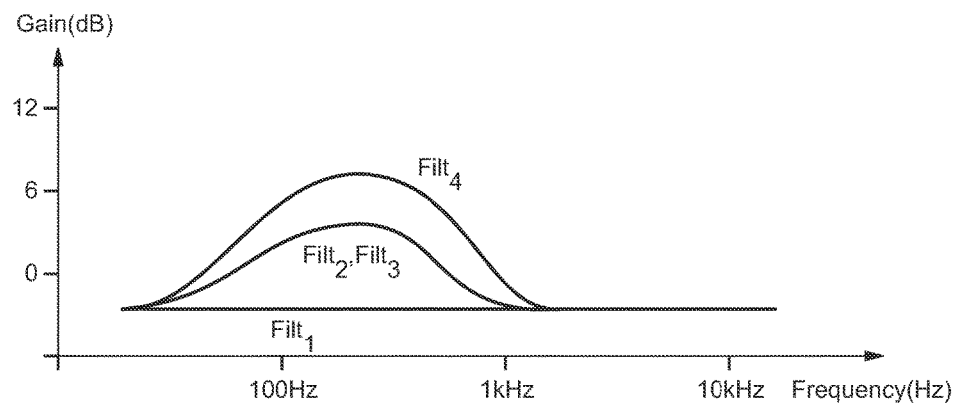
FIG. 21 is a diagram showing typical filter curves for four filters.

In the case of the example SpatialMode matrix shown in Equation (1.10), for a 4-speaker system (S=4), the SpatialMode signals with higher perceived spaciousness will be boosted, particularly in the frequency range between 100 Hz and 1 kHz, as shown in FIG. 21.

FIG. 21 is a diagram showing typical filter curves for the four filters. The application of these different filters will provide an enhanced sense of spaciousness for all listeners situated around the speaker array. Specifically, the use of these boosting filters, applied to the higher spaciousness SpatialMode signals, is a noteworthy feature of the teleconferencing devices described herein (e.g., the device 200 of FIG. 2).

The Matrix R' is intended to form each of the unboosted SpatialMode signals 2016, from the intermediate signals 2014. In one embodiment, this matrix is tailored to provide unboosted SpatialMode signals that are approximately decorrelated with each other. For example, $$R' = \begin{pmatrix} \frac{1}{2} & 0 & 0 \\ 0 & 1 & 0 \\ 0 & 0 & 1 \\ i & 0 & 0 \end{pmatrix} \quad (1.12)$$

In this case, the R' processing circuit is adapted to feed the W, X and Y signals to the first three SpatialModes respectively, and the 4$^{th}$ SpatialMode is fed with a phase-shifted version of W, so that a suitable amount of energy is fed to this SpatialMode. The lower gain of the upper-left coefficient in the matrix indicates that the "common-mode" SpatialMode is fed with less energy that the other three SpatialModes.

Additional Features

An embodiment may have one or more features. One feature is that when there is more than one active (or potentially active) voice stream, the individual voice streams or channels are rendered such that the magnitude and sign of the correlation between speaker pairs is controlled across frequency and predominantly negative in some regions.

Another feature is that the rendering strategy may change with the number of potential streams at any point in time. For example, with two other teleconferencing participants the device 900 may render their audio streams respectively at locations 920*b* and 920*c* (see FIG. 9B); when a third participant joins, the device 900 may render their audio streams respectively at locations 920*d*, 920*e* and 920*f* (see FIG. 9C).

Another feature is that a deliberate amount of decorrelated low order mode is introduced to effect a stability and balance. Another feature is that specific spatial aliasing or warping ideas are applied to the rendered channels or modes such that large variations in listener perception are reduced. Another feature is that the resultant speaker excitation uses a combination of differential feeds. Another feature is that speaker pairs (or the entire array) includes the addition of a suitably uncorrelated common mode (on the speaker pairs or entire array) at a level that is 4-10 dB below. Another feature is that the decorrelator used is a Hilbert filter or an effective relative shift of 90 degrees achieved across a suitable frequency range. Another feature is that the spatial scene is isotropic.

Summary of Operation

Figure 22:
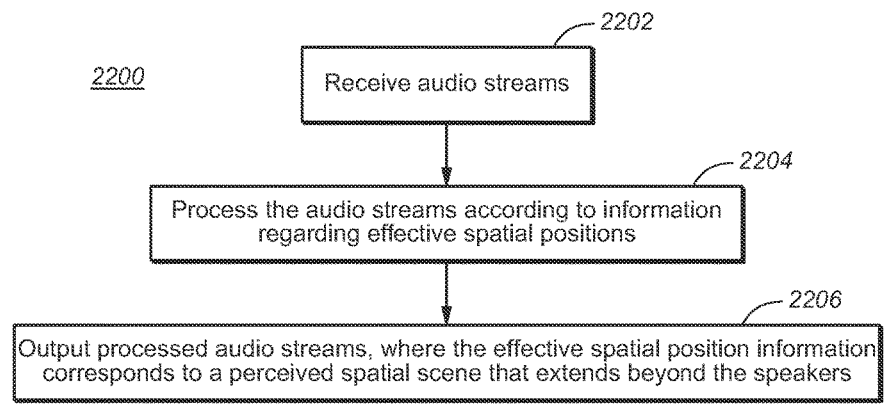
FIG. 22 is a flowchart of a method of outputting audio in a teleconferencing environment.

FIG. 22 is a flowchart of a method 2200 of outputting audio in a teleconferencing environment. The method 2200 may be executed, performed or implemented by an embodiment of the teleconferencing device described above (e.g., the device 200 of FIG. 2, the device 600 of FIG. 6, the device 1300 of FIG. 13, etc.), as controlled by hardware components (e.g., a processor), firmware (e.g., a programmable logic device), or software (e.g., as executed by hardware or firmware).

At 2202, a plurality of audio streams are received. A teleconferencing device such as the device 200 (see FIG. 2) may receive the audio streams. The audio streams may include a mono audio stream, a stereo audio stream, and a spatial audio stream.

At 2204, the audio streams are processed according to information regarding a plurality of effective spatial positions. This processing may be the processing described above regarding FIGS. 18-21. A teleconferencing device such as the device 200 (see FIG. 2) may process the audio streams.

At 2206, at least three speakers arranged in more than one dimension output the processed audio streams. The information regarding the effective spatial positions corresponds to a perceived spatial scene that extends beyond the at least three speakers in at least two dimensions. Examples of the effective spatial positions and the perceived spatial scenes can be seen in FIGS. 6-12.

As mentioned above, the "effective spatial position" refers to the sense of spatial location or desired source separation that the teleconferencing device (e.g., the device 200 of FIG. 2) uses when processing the audio streams, whereas the "perceived spatial scene" refers to the (potentially) different spatial locations or spatial properties of each source as it is perceived by a listener. The perceived spatial locations or spatial scene do not correspond directly with the idea of fixed or anchored position in the physical space; each listener may experience a different spatial scene depending upon their viewpoint. However, the teleconferencing device processes the audio using broad parameters for the spatial scene, such as the apparent width, so that the output is reasonably consistent and each listener perceives the set of sources in a scene with similar loudness and perceived spatial properties.

Implementation Details

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

As a specific example, the device 200 (see FIG. 2) may execute software or firmware that controls its operation, for example to render the spatial scene as described above. The device 200 may include, be connected to, or be controlled by, a computer that is connected via the internet to the conference server 240.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

The invention claimed is:

1. A method of outputting audio in a teleconferencing environment, comprising:
   providing a teleconferencing apparatus, the apparatus including a processor and at least three speakers for outputting audio streams;
   receiving a plurality of audio streams;
   processing the plurality of audio streams according to information regarding a plurality of effective spatial positions, by the processor; and
   outputting, by the at least three speakers, the plurality of audio streams having been processed,
   wherein processing the plurality of audio streams includes:
      rendering the plurality of audio streams into a plurality of spatial mode signals, wherein each of the plurality of spatial mode signals corresponds to one of the at least three speakers; and
      converting the plurality of spatial mode signals into a plurality of speaker feed signals using a spatial mode matrix,
   wherein each element $f_{n,m}$ in the spatial mode matrix is a discrete Fourier transform defined by $$f_{n,m} = \frac{e^{2\pi i n m/S}}{\sqrt{S}}$$

wherein n is a row of $f_{n,m}$ in the spatial mode matrix, m is a column of $f_{n,m}$ in the spatial mode matrix, and S is a number of the at least three speakers.

2. The method of claim 1, wherein the plurality of audio streams are output in a plurality of perceived spatial locations according to the information regarding the plurality of effective spatial positions.

3. The method of claim 2, wherein the information regarding the plurality of effective spatial positions corresponds to a plurality of perceived locations in the perceived spatial scene.

4. The method of claim 3, wherein the plurality of perceived locations differ such that each of the plurality of audio streams originate at a corresponding perceived location of the plurality of perceived locations.

5. The method of claim 1, wherein the plurality of audio streams are processed by enhancing any of out-of-phase components and differential components of the plurality of audio streams.

6. The method of claim 1, wherein the plurality of audio streams includes any of:
   at least two mono audio streams,
   a mono stream and a stereo stream,
   a spatial audio stream, and
   a mono audio stream, a stereo audio stream and a spatial audio stream.

7. The method of claim 1, wherein the plurality of audio streams are processed to output the perceived spatial scene into a circular shape or into two circular shapes.

8. The method of claim 1, wherein the plurality of audio streams are processed to output the perceived spatial scene into any of:
a spiral shape, and
a spherical shape.

9. The method of claim 1, wherein the plurality of audio streams are processed to output the perceived spatial scene that includes a vertical dimension.

10. The method of claim 1, wherein the plurality of audio streams are processed to output a first audio stream at a first effective spatial position, to output a second audio stream at a second effective spatial position that is 120 degrees from the first effective spatial position, and to output a third audio stream at a third effective spatial position that is 120 degrees from the first effective spatial position and 120 degrees from the second effective spatial position.

11. The method of claim 1, wherein the plurality of audio streams includes a combined B-format signal that combines a plurality of captured soundfields from a plurality of endpoints.

12. The method of claim 1, wherein rendering the plurality of audio streams into the plurality of spatial mode signals decorrelates each of the plurality of spatial mode signals with each other of the plurality of spatial mode signals.

13. The method of claim 1, wherein the at least three speakers are arranged having radial symmetry around a center of the teleconferencing apparatus.

14. The method of claim 1, wherein the at least three speakers includes a first speaker, a second speaker and a third speaker, wherein the second speaker is adjacent to the first speaker and to the third speaker, wherein a first distance between the first speaker and the second speaker differs from a second distance between the second speaker and the third speaker.

15. The method of claim 1, wherein the at least three speakers are arranged in at least two lines in more than one dimension and are disposed in a volume of said teleconferencing apparatus such that the audio streams as output by the at least three speakers are directed outwardly from said teleconferencing apparatus.

16. The method of claim 1, wherein the information regarding the plurality of effective spatial positions corresponds to a perceived spatial scene that extends outwardly beyond the at least three speakers in at least two dimensions, wherein the teleconferencing apparatus is at a center position of the perceived spatial scene with respect to the plurality of effective spatial positions, and wherein the at least three speakers direct the perceived spatial scene outwardly into the teleconferencing environment.

17. A teleconferencing apparatus for outputting audio in a teleconferencing environment, comprising:
a processor that is configured to receive a plurality of audio streams and to process the plurality of audio streams according to information regarding a plurality of effective spatial positions; and
at least three speakers,
wherein the processor is configured to process the plurality of audio streams including:
rendering the plurality of audio streams into a plurality of spatial mode signals, wherein each of the plurality of spatial mode signals corresponds to one of the at least three speakers; and
converting the plurality of spatial mode signals into a plurality of speaker feed signals using a spatial mode matrix,
wherein each element $f_{n,m}$ in the spatial mode matrix is a discrete Fourier transform defined by $$f_{n,m} = \frac{e^{2\pi i n m/S}}{\sqrt{S}}$$

wherein n is a row of $f_{n,m}$ in the spatial mode matrix, m is a column of $f_{n,m}$ in the spatial mode matrix, and S is a number of the at least three speakers.

18. The apparatus of claim 17, further comprising:
a case having a plurality of arms, wherein one of the at least three speakers is located at an end of one of the plurality of arms.

19. The apparatus of claim 17, further comprising:
a case having a plurality of faces, wherein one of the at least three speakers is located on one of the plurality of faces.

20. The apparatus of claim 17, further comprising:
a case having a plurality of arms and a plurality of faces, wherein the plurality of faces is located at a plurality of ends of the plurality of arms, and wherein one of the at least three speakers is located on one of the plurality of faces.

21. The apparatus of claim 17, wherein the at least three speakers are arranged in at least two lines in more than one dimension and are disposed in a volume of said teleconferencing apparatus such that the audio streams as output by the at least three speakers are directed outwardly from said teleconferencing apparatus.

22. The apparatus of claim 17, wherein the information regarding the plurality of effective spatial positions corresponds to a perceived spatial scene that extends outwardly beyond the at least three speakers in at least two dimensions, wherein the teleconferencing apparatus is at a center position of the perceived spatial scene with respect to the plurality of effective spatial positions, and wherein the at least three speakers direct the perceived spatial scene outwardly into the teleconferencing environment.

23. A teleconferencing apparatus for outputting audio in a teleconferencing environment, comprising:
a processor that is configured to receive a plurality of audio streams and to process the plurality of audio streams according to information regarding a plurality of effective spatial positions; and
at least three speakers,
wherein the processor is configured to process the plurality of audio streams including:
rendering the plurality of audio streams into a plurality of spatial mode signals, wherein each of the plurality of spatial mode signals corresponds to one of the at least three speakers; and
converting the plurality of spatial mode signals into a plurality of speaker feed signals using a spatial mode matrix,
wherein each element $f_{n,m}$ in the spatial mode matrix is a real transformation defined by $$f_{n,m} = \begin{cases} \dfrac{1}{\sqrt{S}} & (m=1) \\ \dfrac{1}{\sqrt{S}}\cos\left(2\pi n \dfrac{m}{2S}\right) & m>1,\text{ even} \\ \dfrac{1}{\sqrt{S}}\sin\left(2\pi n \dfrac{m-1}{2S}\right) & m>1,\text{ odd} \end{cases}$$

wherein n is a row of $f_{n,m}$ in the spatial mode matrix, m is a column of $f_{n,m}$ in the spatial mode matrix, and S is a number of the at least three speakers.

24. The apparatus of claim 23, wherein the at least three speakers are arranged in at least two lines in more than one dimension and are disposed in a volume of said teleconferencing apparatus such that the audio streams as output by the at least three speakers are directed outwardly from said teleconferencing apparatus.

25. The apparatus of claim 23, wherein the information regarding the plurality of effective spatial positions corresponds to a perceived spatial scene that extends outwardly beyond the at least three speakers in at least two dimensions, wherein the teleconferencing apparatus is at a center position of the perceived spatial scene with respect to the plurality of effective spatial positions, and wherein the at least three speakers direct the perceived spatial scene outwardly into the teleconferencing environment.

\* \* \* \* \*